(12) United States Patent
Zhang et al.

(10) Patent No.: US 11,128,882 B2
(45) Date of Patent: Sep. 21, 2021

(54) HISTORY BASED MOTION CANDIDATE LIST CONSTRUCTION FOR INTRA BLOCK COPY

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/167,232

(22) Filed: Feb. 4, 2021

(65) Prior Publication Data

US 2021/0160532 A1    May 27, 2021

Related U.S. Application Data

(63) Continuation of application No. PCT/CN2019/117907, filed on Nov. 13, 2019.

(30) Foreign Application Priority Data

Nov. 13, 2018  (WO) ................ PCT/CN2018/115176

(51) Int. Cl.
*H04N 19/513* (2014.01)
*H04N 19/176* (2014.01)
(Continued)

(52) U.S. Cl.
CPC ......... *H04N 19/513* (2014.11); *H04N 19/176* (2014.11); *H04N 19/184* (2014.11); *H04N 19/52* (2014.11)

(58) Field of Classification Search
None
See application file for complete search history.

(56) References Cited

U.S. PATENT DOCUMENTS

| 9,860,559 B2 | 1/2018 | Zhang et al. |
| 9,877,043 B2 | 1/2018 | He et al. |

(Continued)

FOREIGN PATENT DOCUMENTS

| CN | 103797799 A | 5/2014 |
| CN | 105519116 A | 4/2016 |

(Continued)

OTHER PUBLICATIONS

Final Office Action from U.S. Appl. No. 17/167,192 dated Aug. 2, 2021.

(Continued)

*Primary Examiner* — Christopher G Findley
(74) *Attorney, Agent, or Firm* — Perkins Coie LLP

(57) ABSTRACT

Devices, systems and methods for digital video coding, which includes constructing separate motion candidate lists for video coding, are described. An exemplary method for video processing includes constructing, for a first video block of a video, a first motion candidate list using a first motion candidate list construction method that includes motion candidates that only relate to history-based motion vector prediction (HMVP) candidates, and performing a conversion between the first video block and a bitstream representation of the video including the first video block according to the constructed first motion candidate list.

18 Claims, 33 Drawing Sheets

(51) Int. Cl.
*H04N 19/184* (2014.01)
*H04N 19/52* (2014.01)

(56) References Cited

U.S. PATENT DOCUMENTS

| | | | |
|---|---|---|---|
| 10,178,403 B2 | 1/2019 | Seregin et al. | |
| 10,284,874 B2 | 5/2019 | He et al. | |
| 10,412,387 B2 | 9/2019 | Pang et al. | |
| 10,516,882 B2 | 12/2019 | He et al. | |
| 10,582,213 B2 | 3/2020 | Li et al. | |
| 2013/0114717 A1 | 5/2013 | Zheng et al. | |
| 2013/0308708 A1 | 11/2013 | Sugio et al. | |
| 2014/0086325 A1 | 3/2014 | Chen et al. | |
| 2014/0286429 A1 | 9/2014 | Arakage et al. | |
| 2015/0208084 A1* | 7/2015 | Zhu | H04N 19/176 375/240.02 |
| 2015/0271515 A1 | 9/2015 | Pang et al. | |
| 2015/0373359 A1 | 12/2015 | He et al. | |
| 2016/0014432 A1 | 1/2016 | Park et al. | |
| 2016/0105670 A1 | 4/2016 | Pang et al. | |
| 2016/0295240 A1 | 10/2016 | Kim et al. | |
| 2017/0078699 A1 | 3/2017 | Park et al. | |
| 2017/0150180 A1 | 5/2017 | Lin et al. | |
| 2017/0223350 A1 | 8/2017 | Xu et al. | |
| 2017/0289566 A1 | 10/2017 | He et al. | |
| 2018/0199057 A1 | 7/2018 | Chuang et al. | |
| 2018/0359483 A1 | 12/2018 | Chen et al. | |
| 2019/0182496 A1 | 6/2019 | Xu et al. | |
| 2019/0200038 A1 | 6/2019 | He et al. | |
| 2019/0200040 A1 | 6/2019 | Lim et al. | |
| 2019/0246143 A1 | 8/2019 | Zhang et al. | |
| 2019/0297325 A1 | 9/2019 | Lim et al. | |
| 2020/0021836 A1* | 1/2020 | Xu | H04N 19/176 |
| 2020/0059658 A1* | 2/2020 | Chien | H04N 19/176 |
| 2020/0077087 A1 | 3/2020 | He et al. | |
| 2020/0077099 A1 | 3/2020 | Ikai et al. | |
| 2020/0137398 A1 | 4/2020 | Zhao et al. | |
| 2020/0396465 A1 | 12/2020 | Zhang et al. | |
| 2020/0404255 A1 | 12/2020 | Zhang et al. | |
| 2020/0404260 A1 | 12/2020 | Zhang et al. | |
| 2020/0413048 A1 | 12/2020 | Zhang et al. | |
| 2021/0160529 A1 | 5/2021 | Zhang et al. | |

FOREIGN PATENT DOCUMENTS

| | | |
|---|---|---|
| CN | 105659602 A | 6/2016 |
| CN | 106576171 A | 4/2017 |
| CN | 107534773 A | 1/2018 |
| WO | 2015052273 A1 | 4/2015 |
| WO | 2016123081 A1 | 8/2016 |
| WO | 2017118409 A1 | 7/2017 |
| WO | 2017197126 A1 | 11/2017 |
| WO | 2018117546 A1 | 6/2018 |

OTHER PUBLICATIONS

Boyce et al. "JVET Common Test Conditions and Software Reference Configurations," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J010, 2018.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.

Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

JEM-7.0: https://jvet.hhi.fraunhofer.de/svn/svn_HMJEMSoftware/tags/ HM-16.6-JEM-7.0.(only website).

Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.

"High Efficiency Video Coding" Series H: Audiovisual and Multimedia Systems: Infrastructure of Audiovisual Services—Coding of Moving Video, ITU-T, H.265, 2018.

Lee et al. "CE4: Simplification of the Common Base for Affine Merge (Test 4.2.6)," Joint Video Experts Team (JVET) of ITU-T SG 16 WP 3 and ISO/IEC JTC 1/SC 29/WG 11, 12th Meeting, Macau, CN, Oct. 8-12, 2018, document JVET-L0142, 2018.

Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.

Rosewarne C et al. "High Efficiency Video Coding (HEVC) Test Model 16 (HM16) Improved Encoder Description Update 7," Joint Collaborative Team on Video Coding (JCT-VC) of ITU-T SG.16 WP3 and ISO/IEC JTC1/SC29/WG11, 25th Meeting, Chengdu, CN, Oct. 14-21, 2016, document JCTVC-Y1002, 2016.

Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1024, 2018.

Zhang et al. "CE4-Related: History-based Motion Vector Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, document JVET-K0104, 2018.

International Search Report and Written Opinion from International Patent Application No. PCT/CN2019/117907 dated Jan. 23, 2020(10 pages).

International Search Report and Written Opinion from International Patent Application No. PCT/CN2019/117930 dated Jan. 23, 2020(9 pages).

International Search Report and Written Opinion from International Patent Application No. PCT/CN2019/117968 dated Feb. 14, 2020(10 pages).

International Search Report and Written Opinion from International Patent Application No. PCT/CN2019/117971 dated Feb. 21, 2020(10 pages).

Non-Final Office Action from U.S. Appl. No. 17/167,192 dated Mar. 25, 2021.

* cited by examiner

HISTORY BASED MOTION CANDIDATE LIST CONSTRUCTION FOR INTRA BLOCK COPY

CROSS REFERENCE TO RELATED APPLICATIONS

This application is a continuation of International Patent Application No. PCT/CN2019/117907, filed on Nov. 13, 2019, which claims the priority to and benefits of International Patent Application No. PCT/CN2018/115176, filed on Nov. 13, 2018. All the aforementioned patent applications are hereby incorporated by reference in their entireties.

TECHNICAL FIELD

This patent document relates to video coding techniques, devices, and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems, and methods related to digital video coding, and specifically, to constructing separate motion candidate lists for video coding are described. The described methods may be applied to both the existing video coding standards (e.g., High Efficiency Video Coding (HEVC)) and future video coding standards or video codecs.

A first exemplary embodiment describes a method of video processing comprises constructing, for a first video block of a video, a first motion candidate list using a first motion candidate list construction method that excludes motion candidates that are only derived from spatial blocks, and performing a conversion between the first video block and a bitstream representation of the video including the first video block according to the constructed first motion candidate list.

In some implementations of the first exemplary embodiment, the first motion candidate list comprises a motion candidate from only temporal blocks. In some implementations of the first exemplary embodiment, the first motion candidate list comprises a motion candidate based on both temporal blocks and spatial blocks. In some implementations of the first exemplary embodiment, the motion candidate is used for sub-block based spatial temporal motion vector prediction (STMVP) or non-sub block based STMVP. In some implementations of the first exemplary embodiment, the first motion candidate list comprises an affine merge candidate that uses information from temporally neighboring video blocks of the first video block to derive an affine model. In some implementations of the first exemplary embodiment, the first motion candidate list excludes an affine merge candidate that uses information from temporally neighboring video blocks of the first video block to derive an affine model.

In some implementations of the first exemplary embodiment, the first motion candidate list comprises a history-based motion vector prediction (HMVP) candidate. In some implementations of the first exemplary embodiment, the first motion candidate list comprises a virtual candidate derived from a temporal motion candidate or a history-based motion vector prediction (HMVP) candidate. In some implementations of the first exemplary embodiment, the first motion candidate list comprises only motion candidates, where each motion candidate is only associated with a single set of motion information that is applied to an entirety of the first video block.

In some implementations of the first exemplary embodiment, the first motion candidate list comprises only motion candidates, where each motion candidate is only associated with multiple sets of motion information, and where each of the multiple sets of motion information is applied to a sub-block of the first video block. In some implementations of the first exemplary embodiment, the first motion candidate list comprises a plurality of motion candidates that are associated with a plurality of temporal blocks of a same reference picture. In some implementations of the first exemplary embodiment, the first motion candidate list comprises a plurality of motion candidates that are associated with a plurality of temporal blocks that are associated with one reference picture of each reference picture list.

In some implementations of the first exemplary embodiment, the first motion candidate list comprises a plurality of motion candidates that are associated with a plurality of temporal blocks that are located in a picture, where a reference index of the picture is pre-defined or signaled in a sequence parameter set (SPS), a picture parameter set (PPS), a slice header, a tile group header, a tile, a coding tree unit (CTU), a coding unit (CU) or a prediction unit (PU). In some implementations of the first exemplary embodiment, the first motion candidate list comprises a plurality of motion candidates that are associated with a plurality of temporal blocks that are is located in a collated coding tree unit (CTU) row that comprises the first video block.

In some implementations of the first exemplary embodiment, the first motion candidate list comprises a plurality of motion candidates that are associated with a plurality of temporal block that are located in a same region of size M×N when a video unit is split to non-overlapped M×N regions, and where M and N are integers that are pre-defined or signaled in a sequence parameter set (SPS), a picture parameter set (PPS), a slice header, a tile group header, a tile, a coding tree unit (CTU), a coding unit (CU) or a prediction unit (PU). In some implementations of the first exemplary embodiment, a generalized bi-prediction (GBi) is disabled for motion candidates in the first motion candidate list, where a GBi index is set to 0 for a motion candidate in the first motion candidate list.

In some implementations of the first exemplary embodiment, the first motion candidate list comprises an alternative temporal motion vector prediction (ATMVP) candidate. In some implementations of the first exemplary embodiment, the ATMVP candidate is located at a fixed position in the first motion candidate list.

A second exemplary embodiment describes a method of video processing comprises constructing, for a first video block of a video, a first motion candidate list that comprises an alternative temporal motion vector prediction (ATMVP) candidate but excludes an affine candidate, and performing a conversion between the first video block and a bitstream representation of the video including the first video block according to the constructed first motion candidate list.

In some implementations of the first and second exemplary embodiments, the method(s) further comprise constructing a second motion candidate list using a second motion candidate list construction method that is different from the first motion candidate list construction method for the first video block. In some implementations of the first and second exemplary embodiments, the bitstream representation includes a list index that identifies a list within a set of multiple motion candidate lists corresponding to multiple motion candidate list construction methods that include the first and second motion candidate list construction methods. In some implementations of the first and second exemplary embodiments, a first list index corresponds to a neighboring video block of the first video block is used to code a second list index of the first video block. In some implementations of the first and second exemplary embodiments, the first list index corresponds to a neighboring video block of the first video block is used in a context selection for coding the second list index of the first video block.

In some implementations of the first and second exemplary embodiments, a same value for the list index corresponds to different motion candidate list construction method for different video blocks of the video. In some implementations of the first and second exemplary embodiments, a signaling of the list index is based on a coded mode information that includes a triangular prediction mode (TPM), a non-affine mode, or non-TPM mode. In some implementations of the first and second exemplary embodiments, the method(s) further comprise performing a pruning operation on the motion candidates in different motion candidate lists in the multiple motion candidate lists. In some implementations of the first and second exemplary embodiments, the method(s) further comprise, based on a mode, determining a usage of multiple motion candidate lists using multiple motion candidate list construction methods or just one motion candidate list using one motion candidate list construction method.

In some implementations of the first and second exemplary embodiments, when the usage of multiple motion candidate lists using multiple motion candidate list construction methods is disabled, a list index for the first motion candidate list is disabled for a mode and not signaled. In some implementations of the first and second exemplary embodiments, the method(s) further comprise, based on a mode, determining that the first motion candidate list construction method for the first video block is enabled. In some implementations of the first and second exemplary embodiments, the mode is a merge mode.

In some implementations of the first and second exemplary embodiments, the mode is an advanced motion vector prediction (AMVP) mode. In some implementations of the first and second exemplary embodiments, the mode is a triangular prediction mode (TPM) mode. In some implementations of the first and second exemplary embodiments, the mode is related to block dimension. In some implementations of the first and second exemplary embodiments, the block dimension includes a product of a height and a width of the first video block is greater than or equal to a threshold. In some implementations of the first and second exemplary embodiments, the threshold is 64. In some implementations of the first and second exemplary embodiments, a height of the first video block is greater than or equal to a first threshold and where a width of the first video block is greater than or equal to a second threshold. In some implementations of the first and second exemplary embodiments, the first threshold is 16 and the second threshold is 16.

In some implementations of the first and second exemplary embodiments, the first motion candidate list comprises a single motion candidate list for video blocks coded with the mode. In some implementations of the first and second exemplary embodiments, the first motion candidate list comprises a single motion candidate list for video blocks not coded with the mode. In some implementations of the first and second exemplary embodiments, the performing the conversion comprises generating pixel values of the first video block from the bitstream representation. In some implementations of the first and second exemplary embodiments, the performing the conversion comprises generating the bitstream representation from pixel values of the first video block.

A third exemplary embodiment describes a method of video processing, comprising constructing, for a first video block of a video, a first motion candidate list using a first motion candidate list construction method that excludes motion candidates that are only derived from spatial blocks, and performing a conversion between the first video block and a bitstream representation of the video including the first video block according to the constructed first motion candidate list.

In some implementations of the third exemplary embodiment, the first motion candidate list comprises a motion candidate from only spatial blocks. In some implementations of the third exemplary embodiment, the first motion candidate list comprises a history-based motion vector prediction (HMVP) candidate. In some implementations of the third exemplary embodiment, the first motion candidate list comprises a virtual candidate derived from a spatial motion candidate or the HMVP candidate. In some implementations of the third exemplary embodiment, the first motion candidate list comprises a motion candidate based on both temporal blocks and spatial blocks.

In some implementations of the third exemplary embodiment, the motion candidate is used for sub-block based spatial temporal motion vector prediction (STMVP) or non-sub block based STMVP. In some implementations of the third exemplary embodiment, a list size of the first motion candidate list is a pre-defined maximum number of allowed motion candidates in the first motion candidate list. In some implementations of the third exemplary embodiment, the list size is 5 or 6. In some implementations of the third exemplary embodiment, a first list size of the first motion candidate list using the first motion candidate list construction method or a second list size of at least one more motion candidate list using a second motion candidate list construction method are separately signaled.

In some implementations of the third exemplary embodiment, a first list size of the first motion candidate list using the first motion candidate list construction method or a second list size of at least one more motion candidate list using a second motion candidate list construction method are signaled once and applied to multiple types of motion candidate lists comprising the first motion candidate list and the at least one more motion candidate list. In some implementations of the third exemplary embodiment, a first list size of the first motion candidate list using the first motion candidate list construction method or a second list size of at least one more motion candidate list using a second motion candidate list construction method are signaled using a sequence parameter set (SPS), a picture parameter set (PPS), a slice header, a tile group header, a tile, a coding tree unit (CTU), a coding unit (CU) or a prediction unit (PU).

In some implementations of the third exemplary embodiment, the at least one more motion candidate list is a temporal candidate list or a spatial candidate list or a history-based motion vector prediction (HMVP) candidate list. In some implementations of the third exemplary embodiment, the method further comprises constructing a second motion candidate list using a second motion candidate list construction method that is different from the first motion candidate list construction method for the first video block.

In some implementations of the third exemplary embodiment, the second motion candidate list is a temporal candidate list that excludes motion candidates derived from only a spatial neighboring block or a history-based motion vector prediction (HMVP) candidate list that excludes motion candidates derived from only a spatial or temporal neighboring block. In some implementations of the third exemplary embodiment, the bitstream representation includes a list index that identifies a list within a set of multiple motion candidate lists corresponding to multiple motion candidate list construction methods that include the first and second motion candidate list construction methods.

In some implementations of the third exemplary embodiment, the method further comprises, based on a mode, determining a usage of multiple motion candidate lists using multiple motion candidate list construction methods or just one motion candidate list using one motion candidate list construction method. In some implementations of the third exemplary embodiment, when a usage of the multiple motion candidate lists using the multiple motion candidate list construction methods is disabled, a list index for the first motion candidate list is disabled for a mode and not signaled.

In some implementations of the third exemplary embodiment, the method further comprises, based on a mode, determining that the first motion candidate list construction method for the first video block is enabled. In some implementations of the third exemplary embodiment, the mode is a merge mode. In some implementations of the third exemplary embodiment, the mode is an advanced motion vector prediction (AMVP) mode. In some implementations of the third exemplary embodiment, the mode is a triangular prediction mode (TPM) mode. In some implementations of the third exemplary embodiment, the mode is related to block dimension.

In some implementations of the third exemplary embodiment, the block dimension includes a product of a height and a width of the first video block is greater than or equal to a threshold. In some implementations of the third exemplary embodiment, the threshold is 64. In some implementations of the third exemplary embodiment, a height of the first video block is greater than or equal to a first threshold and where a width of the first video block is greater than or equal to a second threshold. In some implementations of the third exemplary embodiment, the first threshold is 16 and the second threshold is 16. In some implementations of the third exemplary embodiment, the first motion candidate list comprises a single motion candidate list for video blocks coded with the mode.

In some implementations of the third exemplary embodiment, the first motion candidate list comprises a single motion candidate list for video blocks not coded with the mode. In some implementations of the third exemplary embodiment, the performing the conversion comprises generating pixel values of the first video block from the bitstream representation. In some implementations of the third exemplary embodiment, the performing the conversion comprises generating the bitstream representation from pixel values of the first video block.

A fourth exemplary embodiment describes a method of video processing, comprising constructing, for a first video block of a video, a first motion candidate list using a first motion candidate list construction method that excludes motion candidates that are only derived from spatial blocks, and performing a conversion between the first video block and a bitstream representation of the video including the first video block according to the constructed first motion candidate list In some implementations of the fourth exemplary embodiment, the first motion candidate list is an intra block copy (IBC) list. In some implementations of the fourth exemplary embodiment, the same reference picture is a current picture, or a current tile, or a current slice, where the first video block belongs to the current picture, the current tile, or the current slice. In some implementations of the fourth exemplary embodiment, each of the motion candidates is a uni-prediction candidate. In some implementations of the fourth exemplary embodiment, the motion candidates include a uni-prediction candidate and a bi-prediction candidate, and where the uni-prediction candidate and the bi-direction candidate use the same reference picture for both reference picture lists.

In some implementations of the fourth exemplary embodiment, the first motion candidate list includes a motion candidate with motion information from spatial blocks. In some implementations of the fourth exemplary embodiment, the spatial blocks are adjacent or non-adjacent to the first video block. In some implementations of the fourth exemplary embodiment, the motion candidates include a history-based motion vector prediction (HMVP) candidate. In some implementations of the fourth exemplary embodiment, the first motion candidate list includes at least one default motion candidate with pre-defined or calculated motion vectors. In some implementations of the fourth exemplary embodiment, the pre-defined or calculated motion vectors are based on any one or more of (1) a location of the first video block, (2) an allowed search range of an intra block copy (IBC) mode, and (3) a maximally allowed unit size of a motion compensated block.

In some implementations of the fourth exemplary embodiment, the maximally allowed unit size of the motion compensated block is 64×64 pixels. In some implementations of the fourth exemplary embodiment, a list size of the first motion candidate list is a pre-defined maximum number of allowed motion candidates in the first motion candidate list. In some implementations of the fourth exemplary embodiment, the list size is 5 or 6. In some implementations of the fourth exemplary embodiment, a first list size of the first motion candidate list using the first motion candidate list construction method or a second list size of at least one more motion candidate list using a second motion candidate list construction method are separately signaled.

In some implementations of the fourth exemplary embodiment, a first list size of the first motion candidate list using the first motion candidate list construction method or a second list size of at least one more motion candidate list using a second motion candidate list construction method are signaled once and applied to multiple types of motion candidate lists comprising the first motion candidate list and the at least one more motion candidate list. In some implementations of the fourth exemplary embodiment, a first list size of the first motion candidate list using the first motion candidate list construction method or a second list size of at least one more motion candidate list using a second motion candidate list construction method are signaled using a sequence parameter set (SPS), a picture parameter set (PPS), a slice header, a tile group header, a tile, a coding tree unit (CTU), a coding unit (CU) or a prediction unit (PU).

In some implementations of the fourth exemplary embodiment, the at least one more motion candidate list is a temporal candidate list that excludes motion candidates derived from only a spatial neighboring block or a spatial candidate list that excludes motion candidates derived from only a temporal neighboring block or a history-based motion vector prediction (HMVP) candidate list that excludes motion candidates derived from only a temporal or spatial neighboring block and includes a HMVP candidate. In some implementations of the fourth exemplary embodiment, the method further includes constructing a second motion candidate list using a second motion candidate list construction method that is different from the first motion candidate list construction method for the first video block. In some implementations of the fourth exemplary embodiment, the second motion candidate list is a temporal candidate list that excludes motion candidates derived from only a spatial neighboring block or a HMVP candidate list that excludes motion candidates derived from only a spatial or temporal neighboring block In some implementations of the fourth exemplary embodiment, the bitstream representation includes a list index that identifies a list within a set of multiple motion candidate lists corresponding to multiple motion candidate list construction methods that include the first and second motion candidate list construction methods. In some implementations of the fourth exemplary embodiment, the method further includes, based on a mode, determining a usage of multiple motion candidate lists using multiple motion candidate list construction methods or just one motion candidate list using one motion candidate list construction method.

In some implementations of the fourth exemplary embodiment, when a usage of the multiple motion candidate lists using the multiple motion candidate list construction methods is disabled, a list index for the first motion candidate list is disabled for a mode and not signaled. In some implementations of the fourth exemplary embodiment, the method further includes, based on a mode, determining that the first motion candidate list construction method for the first video block is enabled. In some implementations of the fourth exemplary embodiment, the mode is a merge mode. In some implementations of the fourth exemplary embodiment, the mode is an advanced motion vector prediction (AMVP) mode. In some implementations of the fourth exemplary embodiment, the mode is a triangular prediction mode (TPM) mode.

In some implementations of the fourth exemplary embodiment, the mode is related to block dimension. In some implementations of the fourth exemplary embodiment, the block dimension includes a product of a height and a width of the first video block is greater than or equal to a threshold. In some implementations of the fourth exemplary embodiment, the threshold is 64. In some implementations of the fourth exemplary embodiment, a height of the first video block is greater than or equal to a first threshold and where a width of the first video block is greater than or equal to a second threshold. In some implementations of the fourth exemplary embodiment, the first threshold is 16 and the second threshold is 16.

In some implementations of the fourth exemplary embodiment, the first motion candidate list comprises a single motion candidate list for video blocks coded with the mode. In some implementations of the fourth exemplary embodiment, the first motion candidate list comprises a single motion candidate list for video blocks not coded with the mode. In some implementations of the fourth exemplary embodiment, the performing the conversion comprises generating pixel values of the first video block from the bitstream representation. In some implementations of the fourth exemplary embodiment, the performing the conversion comprises generating the bitstream representation from pixel values of the first video block.

A fifth exemplary embodiment describes a method of video processing, comprising constructing, for a first video block of a video, a first motion candidate list using a first motion candidate list construction method that includes motion candidates that only relate to history-based motion vector prediction (HMVP) candidates, and performing a conversion between the first video block and a bitstream representation of the video including the first video block according to the constructed first motion candidate list.

In some implementations of the fifth exemplary embodiment, the first motion candidate list comprises a default motion vector candidate. In some implementations of the fifth exemplary embodiment, the default motion vector candidate includes a zero motion vector candidate. In some implementations of the fifth exemplary embodiment, the first motion candidate list comprises candidates derived from existing HMVP candidates. In some implementations of the fifth exemplary embodiment, a list size of the first motion candidate list is a pre-defined maximum number of allowed motion candidates in the first motion candidate list. In some implementations of the fifth exemplary embodiment, the list size is 5 or 6. In some implementations of the fifth exemplary embodiment, a first list size of the first motion candidate list using the first motion candidate list construction method or a second list size of at least one more motion candidate list using a second motion candidate list construction method are separately signaled.

In some implementations of the fifth exemplary embodiment, a first list size of the first motion candidate list using the first motion candidate list construction method or a second list size of at least one more motion candidate list using a second motion candidate list construction method are signaled once and applied to multiple types of motion candidate lists comprising the first motion candidate list and the at least one more motion candidate list. In some implementations of the fifth exemplary embodiment, a first list size of the first motion candidate list using the first motion candidate list construction method or a second list size of at least one more motion candidate list using a second motion candidate list construction method are signaled using a sequence parameter set (SPS), a picture parameter set (PPS), a slice header, a tile group header, a tile, a coding tree unit (CTU), a coding unit (CU) or a prediction unit (PU).

In some implementations of the fifth exemplary embodiment, the at least one more motion candidate list is a temporal candidate list that excludes motion candidates derived from only a spatial neighboring block or a spatial candidate list that excludes motion candidates derived from only a temporal neighboring block or a history-based motion vector prediction (HMVP) candidate list that excludes motion candidates derived from only a temporal or spatial neighboring block and includes a HMVP candidate. In some implementations of the fifth exemplary embodiment, the method further includes constructing a second motion candidate list using a second motion candidate list construction method that is different from the first motion candidate list construction method for the first video block.

In some implementations of the fifth exemplary embodiment, the second motion candidate list is a temporal candidate list that excludes motion candidates derived from only a spatial neighboring block or a HMVP candidate list that excludes motion candidates derived from only a spatial or temporal neighboring block. In some implementations of the fifth exemplary embodiment, the bitstream representation includes a list index that identifies a list within a set of multiple motion candidate lists corresponding to multiple motion candidate list construction methods that include the first and second motion candidate list construction methods. In some implementations of the fifth exemplary embodiment, the method further includes, based on a mode, determining a usage of multiple motion candidate lists using multiple motion candidate list construction methods or just one motion candidate list using one motion candidate list construction method. In some implementations of the fifth exemplary embodiment, when a usage of the multiple motion candidate lists using the multiple motion candidate list construction methods is disabled, a list index for the first motion candidate list is disabled for a mode and not signaled.

In some implementations of the fifth exemplary embodiment, the method further includes, based on a mode, determining that the first motion candidate list construction method for the first video block is enabled. In some implementations of the fifth exemplary embodiment, the mode is a merge mode. In some implementations of the fifth exemplary embodiment, the mode is an advanced motion vector prediction (AMVP) mode. In some implementations of the fifth exemplary embodiment, the mode is a triangular prediction mode (TPM) mode.

In some implementations of the fifth exemplary embodiment, based on an intra block copy (IBC) mode, generating a motion vector for the first video block, where the IBC mode uses a current picture, or a current tile, or a current slice including the first video block as a reference picture. In some implementations of the fifth exemplary embodiment, the mode is related to block dimension. In some implementations of the fifth exemplary embodiment, the block dimension includes a product of a height and a width of the first video block is greater than or equal to a threshold. In some implementations of the fifth exemplary embodiment, the block dimension includes a product of a height and a width of the first video block is less than a threshold. In some implementations of the fifth exemplary embodiment, the threshold is 16 or 64.

In some implementations of the fifth exemplary embodiment, a height of the first video block is greater than or equal to a first threshold and where a width of the first video block is greater than or equal to a second threshold. In some implementations of the fifth exemplary embodiment, the first threshold is 16 and the second threshold is 16. In some implementations of the fifth exemplary embodiment, the first motion candidate list comprises a single motion candidate list for video blocks coded with the mode. In some implementations of the fifth exemplary embodiment, the first motion candidate list comprises a single motion candidate list for video blocks not coded with the mode. In some implementations of the fifth exemplary embodiment, the performing the conversion comprises generating pixel values of the first video block from the bitstream representation. In some implementations of the fifth exemplary embodiment, the performing the conversion comprises generating the bitstream representation from pixel values of the first video block.

In another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description, and the claims.

BRIEF DESCRIPTION OF THE DRAWINGS

FIG. 23 shows an example of intra-picture block copy.

DETAILED DESCRIPTION

Figure 1:
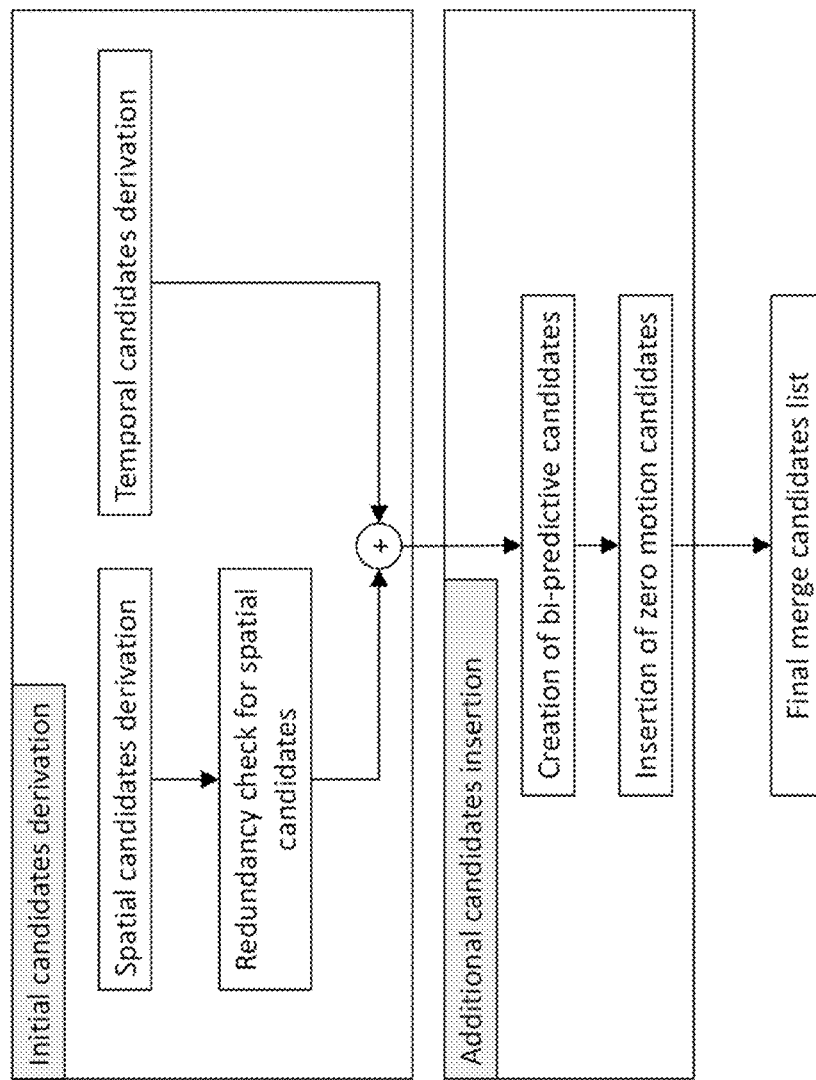
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1 Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates FIG. 1 shows an example of constructing a merge candidate list based on the sequence of steps summarized above. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
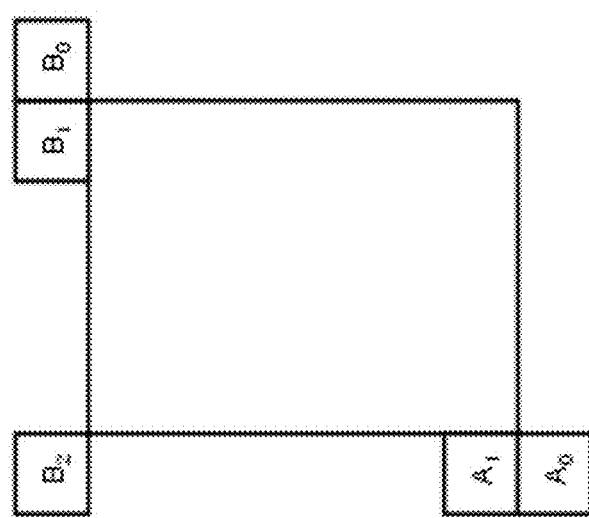
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
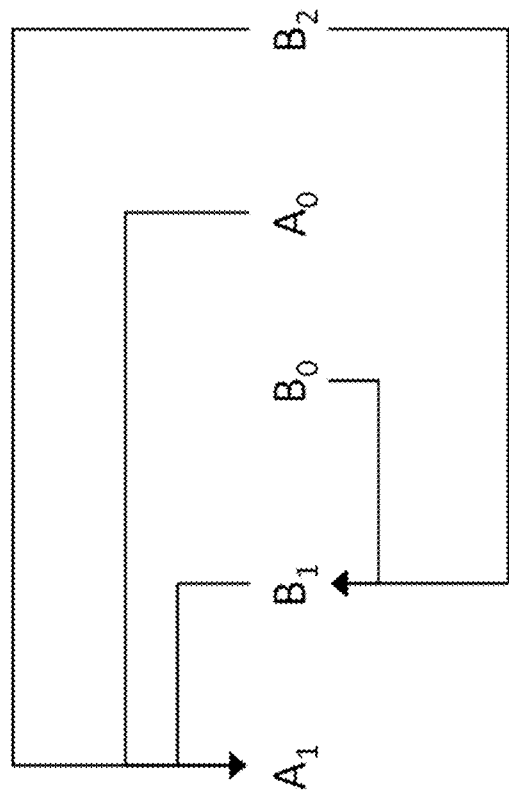
FIG. 3 shows an example of candidate pairs subject to a redundancy check of spatial merge candidates.
Figure 4B:
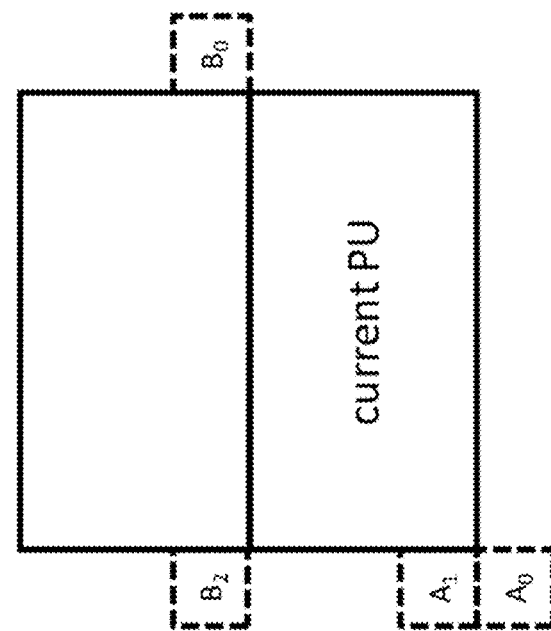
FIGS. 4A and 4B show examples of the position of a second prediction unit (PU) based on the size and shape of the current block.
Figure 4A:
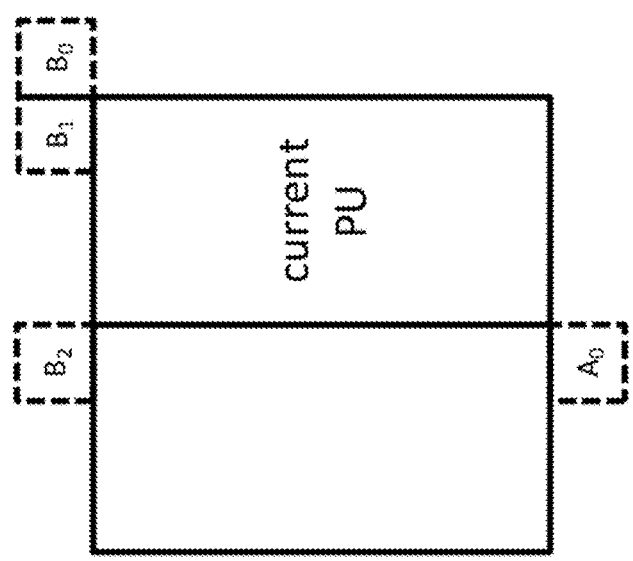

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position Bi is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
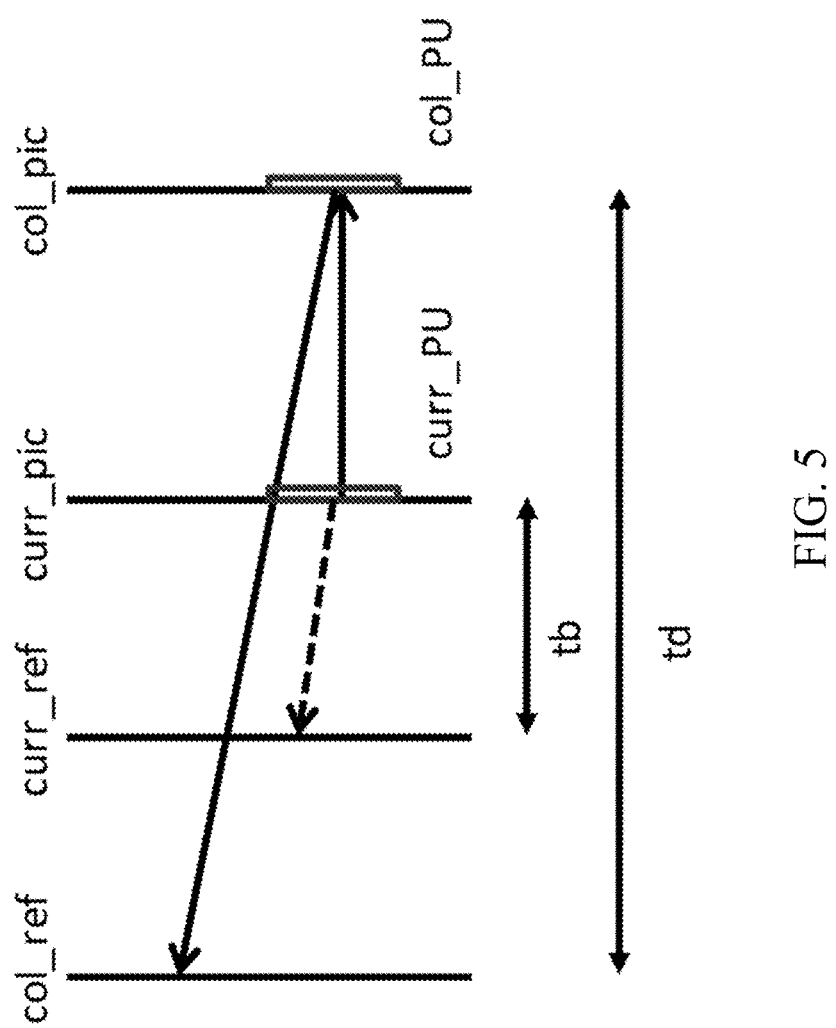
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
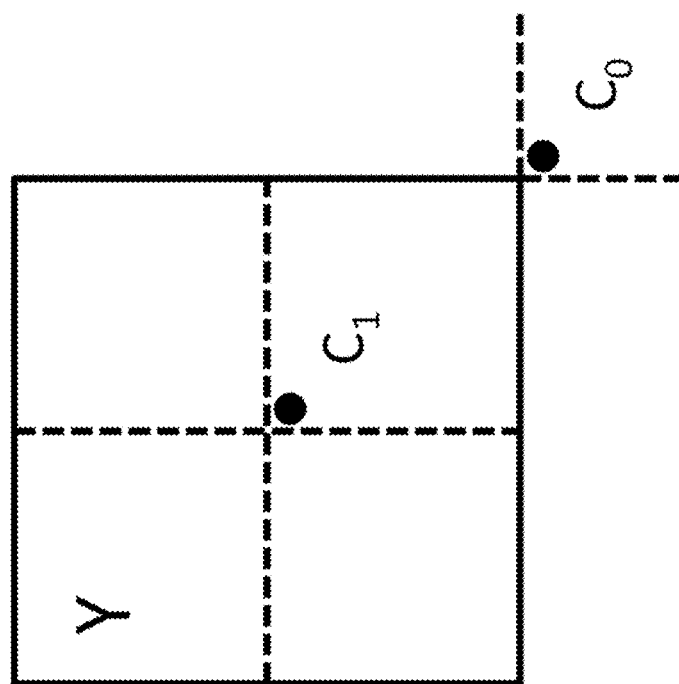
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
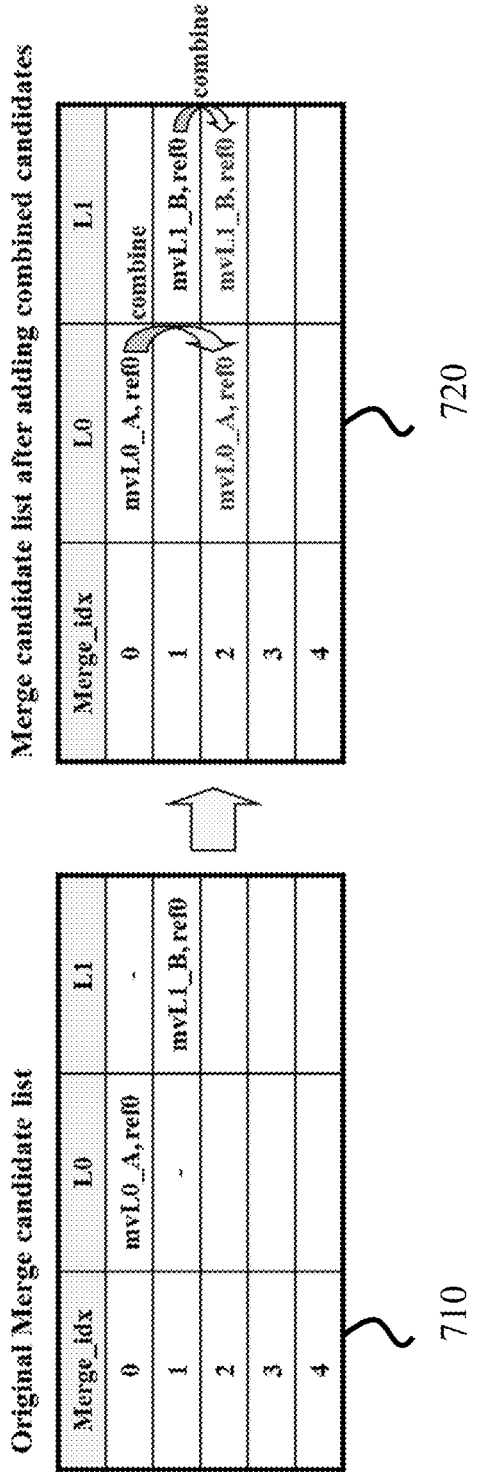
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

1.1.5 Examples of Motion Estimation Regions for Parallel Processing

To speed up the encoding process, motion estimation can be performed in parallel whereby the motion vectors for all prediction units inside a given region are derived simultaneously. The derivation of merge candidates from spatial neighborhood may interfere with parallel processing as one prediction unit cannot derive the motion parameters from an adjacent PU until its associated motion estimation is completed. To mitigate the trade-off between coding efficiency and processing latency, a motion estimation region (MER) may be defined. The size of the MER may be signaled in the picture parameter set (PPS) using the "log_2_parallel_merge_level_minus2" syntax element. When a MER is defined, merge candidates falling in the same region are marked as unavailable and therefore not considered in the list construction.

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly, with merge index signaling, the index of the best motion vector candidate is encoded using truncated unary. The maximum value to be encoded in this case is 2 (see FIG. 8). In the following sections, details about derivation process of motion vector prediction candidate are provided.

1.2.1 Examples of Deriving AMVP Candidates

Figure 8:
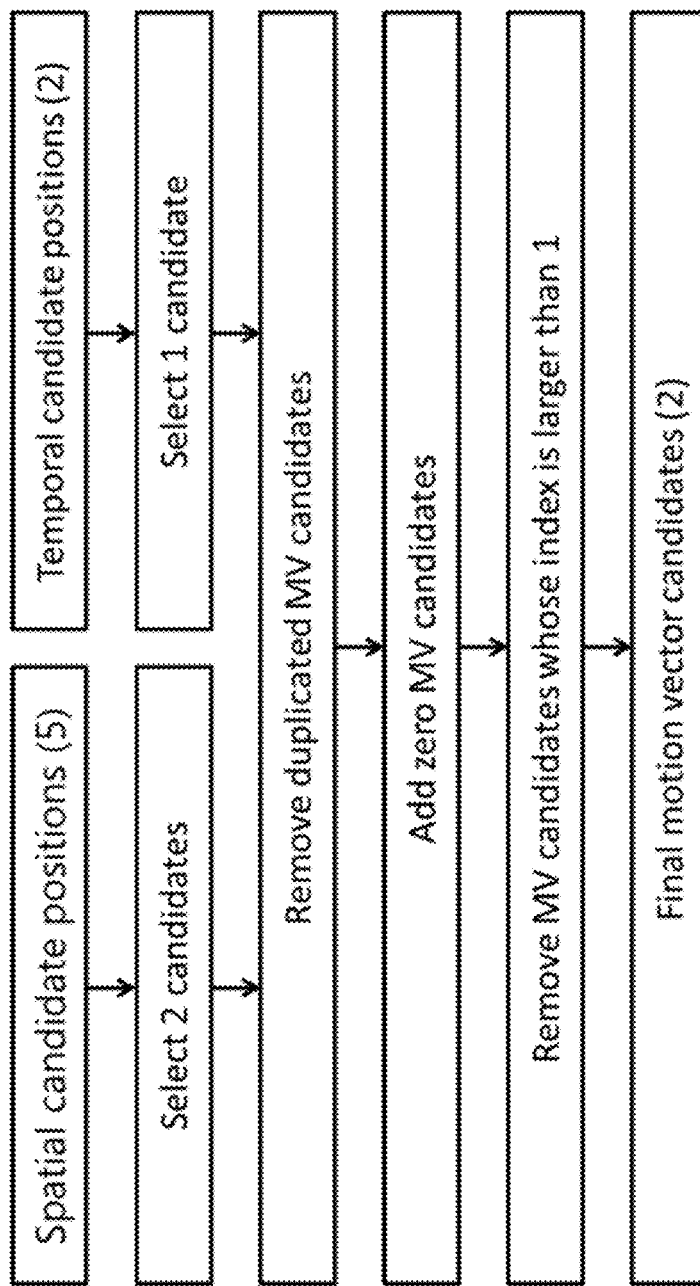
FIG. 8 shows an example of constructing motion vector prediction candidates.

FIG. 8 summarizes derivation process for motion vector prediction candidate and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

—No Spatial Scaling
(1) Same reference picture list, and same reference picture index (same POC)
(2) Different reference picture list, but same reference picture (same POC)
—Spatial Scaling
(3) Same reference picture list, but different reference picture (different POC)
(4) Different reference picture list, and different reference picture (different POC)

The no-spatial-scaling cases are checked first followed by the cases that allow spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
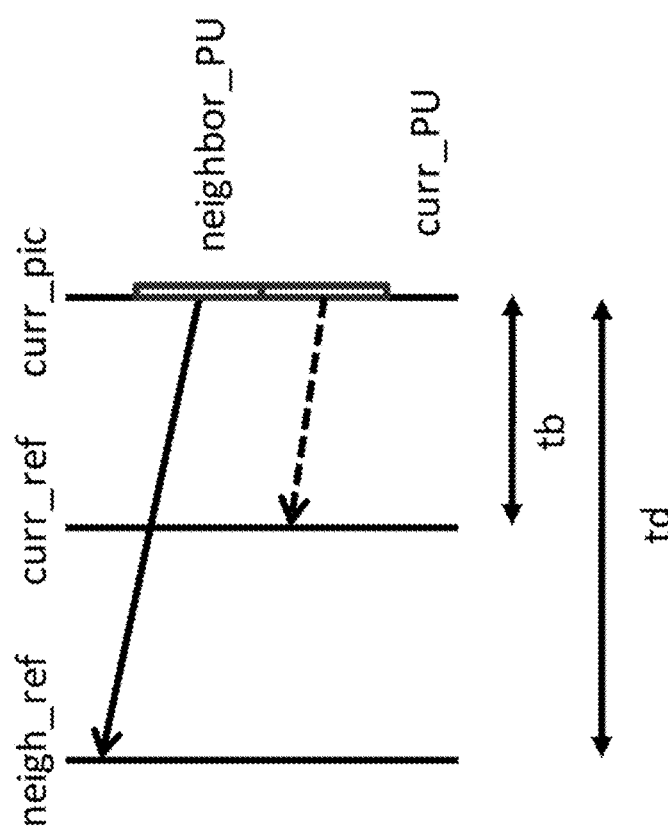
FIG. 9 shows an example of motion vector scaling for spatial motion vector candidates.

As shown in the example in FIG. 9, for the spatial scaling case, the motion vector of the neighboring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2. Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
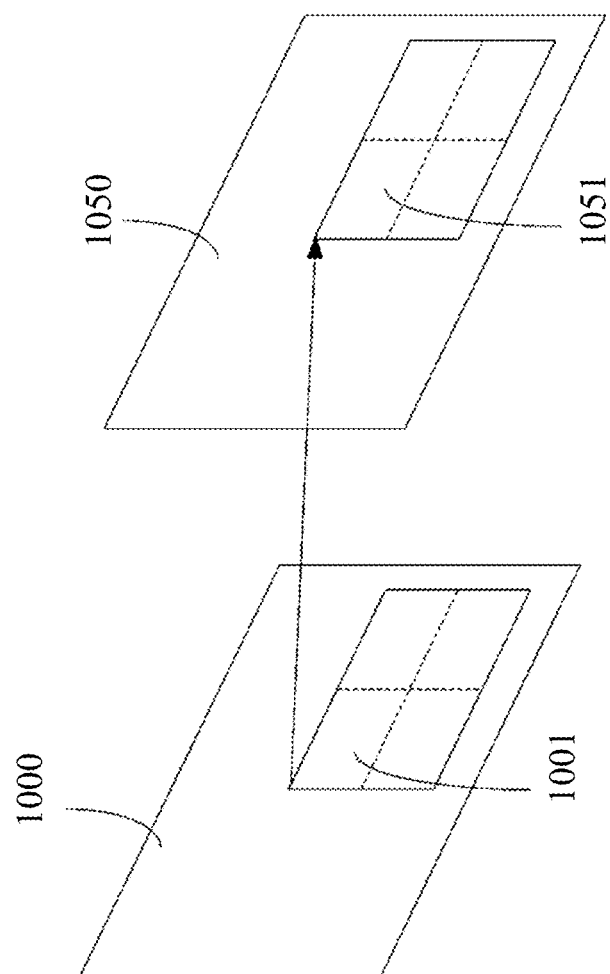
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
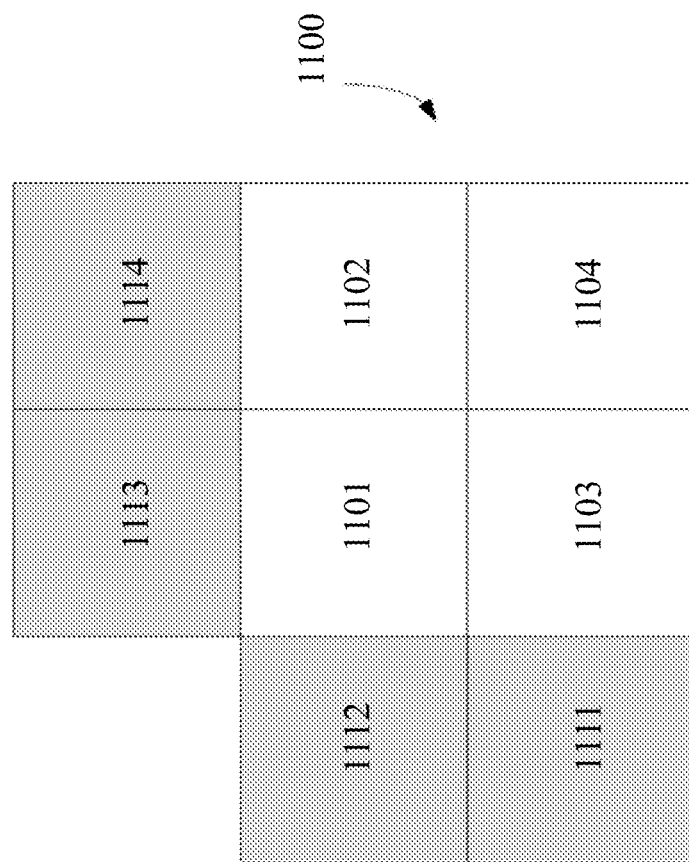
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Example of Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.2.1 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
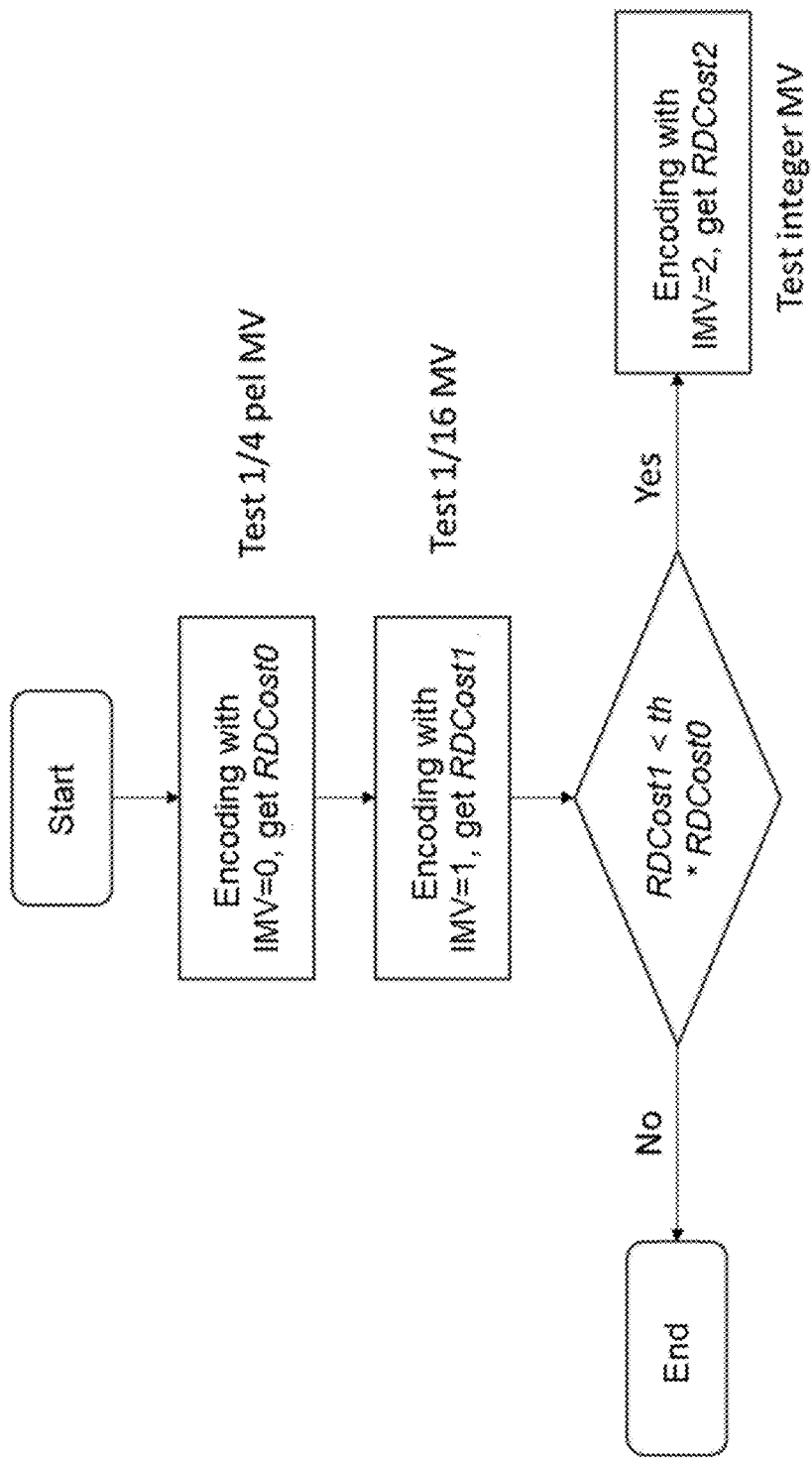
FIG. 12 shows an example flowchart for encoding with different MV precisions.

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive valued threshold), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.2.2 Example of the Triangular Prediction Unit Mode

Figures 13A, 13B:
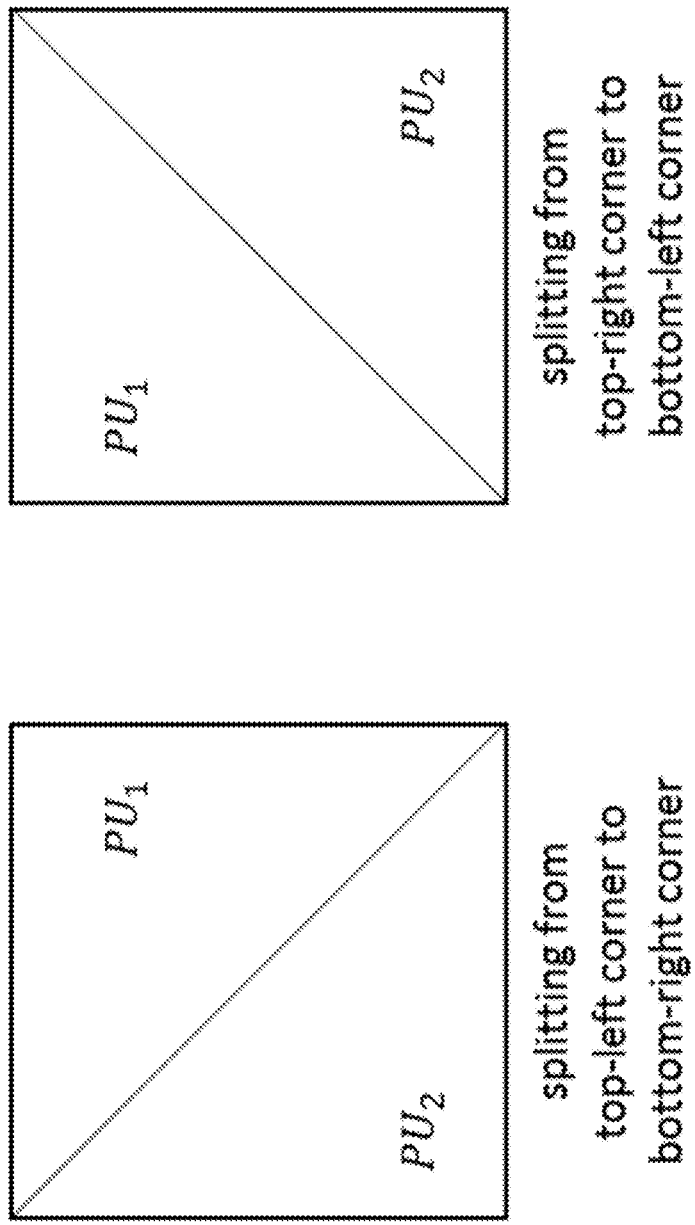
FIGS. 13A and 13B show examples of splitting a coding unit (CU) into two triangular prediction units (PUs).

The concept of the triangular prediction unit mode is to introduce a new triangular partition for motion compensated prediction. As shown in FIGS. 13A and 13B, the triangular prediction unit mode splits a CU into two triangular prediction units, in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

Uni-Prediction Candidate List for TPM

Figure 14:
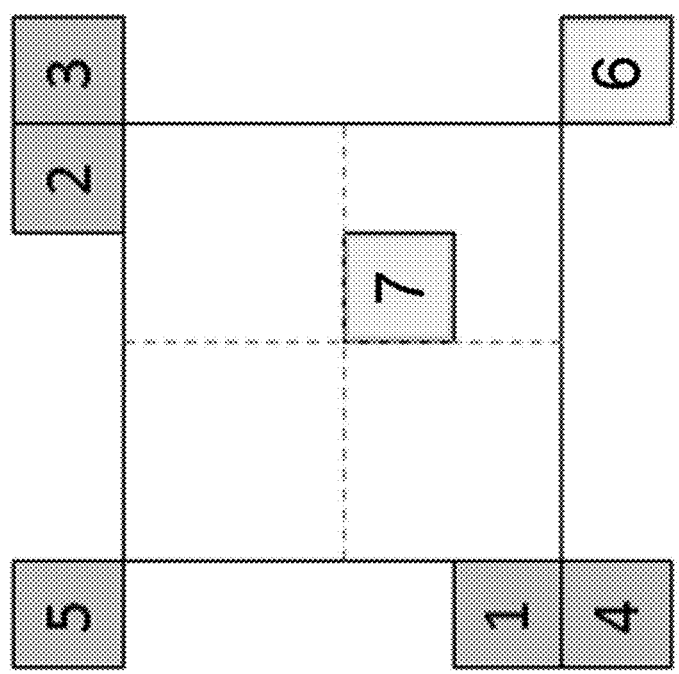
FIG. 14 shows an example of the positions of neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 14. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:

1) Obtain regular motion candidates from $A_1$, $B_1$, $B_0$, $A_0$, $B_2$, Col and Col2 (corresponding to block 1-7 in FIG. 14) without any pruning operations.

2) Set variable numCurrMergeCand=0

3) For each regular motion candidates derived from $A_1$, $B_1$, $B_0$, $A_0$, $B_2$, Col and Col2 and numCurrMergeCand is less than 5, if the regular motion candidate is uni-prediction (either from List 0 or List 1), it is directly added to the merge list as an TPM candidate with numCurrMergeCand increased by 1. Such a TPM candidate is named 'originally uni-predicted candidate'.

Full pruning is applied.

4) For each motion candidates derived from $A_1$, $B_1$, $B_0$, $A_0$, $B_2$, Col and Col2 and numCurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.

Full pruning is applied.

5) For each motion candidates derived from $A_1$, $B_1$, $B_0$, $A_0$, $B_2$, Col and Col2 and numCurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1-predicted candidate'.

Full pruning is applied.

6) For each motion candidates derived from $A_1$, $B_1$, $B_0$, $A_0$, $B_2$, Col and Col2 and numCurrMergeCand is less than 5, if the regular motion candidate is bi-prediction,
If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.
Otherwise, the motion information of List 0 is firstly scaled to List 1 reference picture, and the average of the two MVs (one is from original List 1, and the other is the scaled MV from List 0) is added to the TPM merge list, such a TPM candidate is called averaged uni-prediction from List 1 motion candidate and numCurrMergeCand increased by 1.

Full pruning is applied.

7) If numCurrMergeCand is less than 5, zero motion vector candidates are added.

When inserting a candidate to the list, if it has to be compared to all previously added candidates to see whether it is identical to one of them, such a process is called full pruning.

Adaptive Weighting Process

After predicting each triangular prediction unit, an adaptive weighting process is applied to the diagonal edge between the two triangular prediction units to derive the final prediction for the whole CU. Two weighting factor groups are listed as follows:

$1^{st}$ weighting factor group: {7/8, 6/8, 4/8, 2/8, 1/8} and {7/8, 4/8, 1/8} are used for the luminance and the chrominance samples, respectively; and $2^{nd}$ weighting factor group: {7/8, 6/8, 5/8, 4/8, 3/8, 2/8, 1/8} and {6/8, 4/8, 2/8} are used for the luminance and the chrominance samples, respectively.

One weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the $1^{st}$ weighting factor group is used.

Signaling of Triangular Prediction Mode (TPM)

One bit flag to indicate whether TPM is used may be firstly signaled. Afterwards, the indications of two splitting patterns (as depicted in FIGS. 13A and 13B), and selected merge indices for each of the two partitions are further signaled.

Signaling of TPM Flag

Denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

Figure 15:
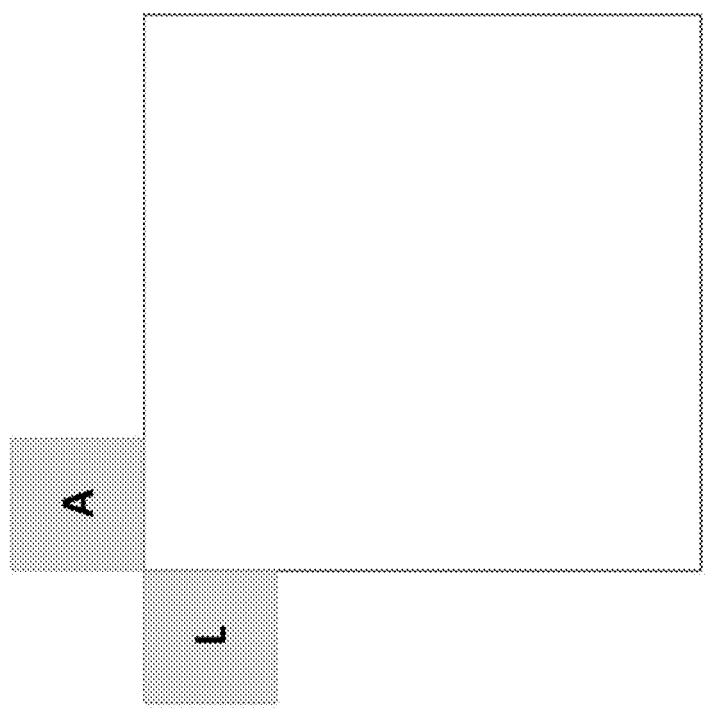
FIG. 15 shows an example of neighboring block used for context selection in triangular prediction mode (TPM) flag coding.

The flag is coded with 3 contexts, in view of FIG. 15, and based on the following equation:

Ctx index=((left block $L$ available && $L$ is coded with TPM?)1:0)+((Above block $A$ available && $A$ is coded with TPM?)1:0);

Signaling an Indication of Two Splitting Patterns and Selected Merge Indices

It is noted that splitting patterns (as shown in FIGS. 13A and 13B), merge indices of two partitions are jointly coded. In existing implementation, a restriction is that the two partitions couldn't use the same reference index. Therefore, there are 2 (splitting patterns)*N (maximum number of merge candidates)*(N−1) possibilities wherein N is set to 5. One indication is coded and the mapping between the splitting patterns, two merge indices and coded indication are derived from the array defined below:

const uint8_t g_TriangleCombination[TRIANGLE_MAX_NUM_CANDS][3]={{0, 1, 0}, {1, 0, 1}, {1, 0, 2}, {0, 0, 1}, {0, 2, 0}, {1, 0, 3}, {1, 0, 4}, {1, 1, 0}, {0, 3, 0}, {0, 4, 0}, {0, 0, 2}, {0, 1, 2}, {1, 1, 2}, {0, 0, 4}, {0, 0, 3}, {0, 1, 3}, {0, 1, 4}, {1, 1, 4}, {1, 1, 3}, {1, 2, 1}, {1, 2, 0}, {0, 2, 1}, {0, 4, 3}, {1, 3, 0}, {1, 3, 2}, {1, 3, 4}, {1, 4, 0}, {1, 3, 1}, {1, 2, 3}, {1, 4, 1}, {0, 4, 1}, {0, 2, 3}, {1, 4, 2}, {0, 3, 2}, {1, 4, 3}, {0, 3, 1}, {0, 2, 4}, {1, 2, 4}, {0, 4, 2}, {0, 3, 4}};

splitting patterns (45 degree or 135 degree)=g_TriangleCombination[signaled indication][0];

Merge index of candidate A=g_TriangleCombination[signaled indication][1];

Merge index of candidate B=g_TriangleCombination[signaled indication][2];

Once the two motion candidates A and B are derived, the two partitions' (PU1 and PU2) motion information could be set either from A or B. Whether PU1 uses the motion information of merge candidate A or B is dependent on the prediction directions of the two motion candidates. Table 1 shows the relationship between two derived motion candidates A and B, with the two partitions.

TABLE 1

| Derivation of partitions' motion information from derived two merge candidates (A, B) | | | |
|---|---|---|---|
| Prediction direction of A | Prediction direction of B | PU1's motion information | PU2's motion information |
| L0 | L0 | A (L0) | B (L0) |
| L1 | L1 | B (L1) | A (L1) |
| L0 | L1 | A (L0) | B (L1) |
| L1 | L0 | B (L0) | A (L1) |

Entropy Coding of the Indication (Denoted by Merge_Triangle_Idx)

merge_triangle_idx is within the range [0, 39], inclusively. K-th order Exponential Golomb (EG) code is used for binarization of merge_triangle_idx wherein K is set to 1.

K-th Order EG

To encode larger numbers in fewer bits (at the expense of using more bits to encode smaller numbers), this can be generalized using a nonnegative integer parameter k. To encode a nonnegative integer x in an order-k exp-Golomb code:
(1) Encode $\lfloor x/2^k \rfloor$ using order-0 exp-Golomb code described above, then
(2) Encode x mod $2^k$ in binary

TABLE 2

Exp-Golomb-k coding examples

| x | k = 0 | k = 1 | k = 2 |
|---|---|---|---|
| 0 | 1 | 10 | 100 |
| 1 | 010 | 11 | 101 |
| 2 | 011 | 0100 | 110 |
| 3 | 00100 | 0101 | 111 |
| 4 | 00101 | 0110 | 01000 |
| 5 | 00110 | 0111 | 01001 |
| 6 | 00111 | 001000 | 01010 |
| 7 | 0001000 | 001001 | 01011 |
| 8 | 0001001 | 001010 | 01100 |
| 9 | 0001010 | 001011 | 01101 |
| 10 | 0001011 | 001100 | 01110 |
| 11 | 0001100 | 001101 | 01111 |
| 12 | 0001101 | 001110 | 0010000 |
| 13 | 0001110 | 001111 | 0010001 |
| 14 | 0001111 | 00010000 | 0010010 |
| 15 | 000010000 | 00010001 | 0010011 |
| 16 | 000010001 | 00010010 | 0010100 |
| 17 | 000010010 | 00010011 | 0010101 |
| 18 | 000010011 | 00010100 | 0010110 |
| 19 | 000010100 | 00010101 | 0010111 |

2.2.3 Examples of Affine Motion Compensation Prediction

Figure 16A:
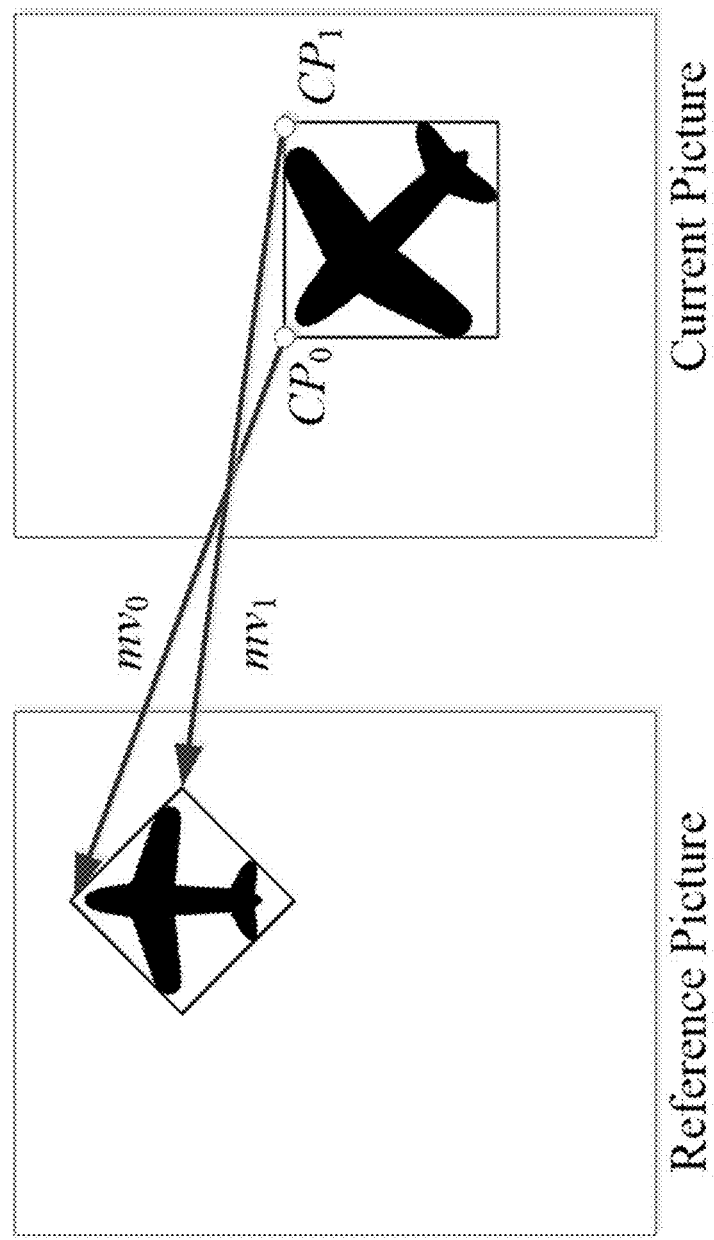
FIGS. 16A and 16B show examples of the simplified 4-parameter affine model and the simplified 6-parameter affine model, respectively.
Figure 16B:
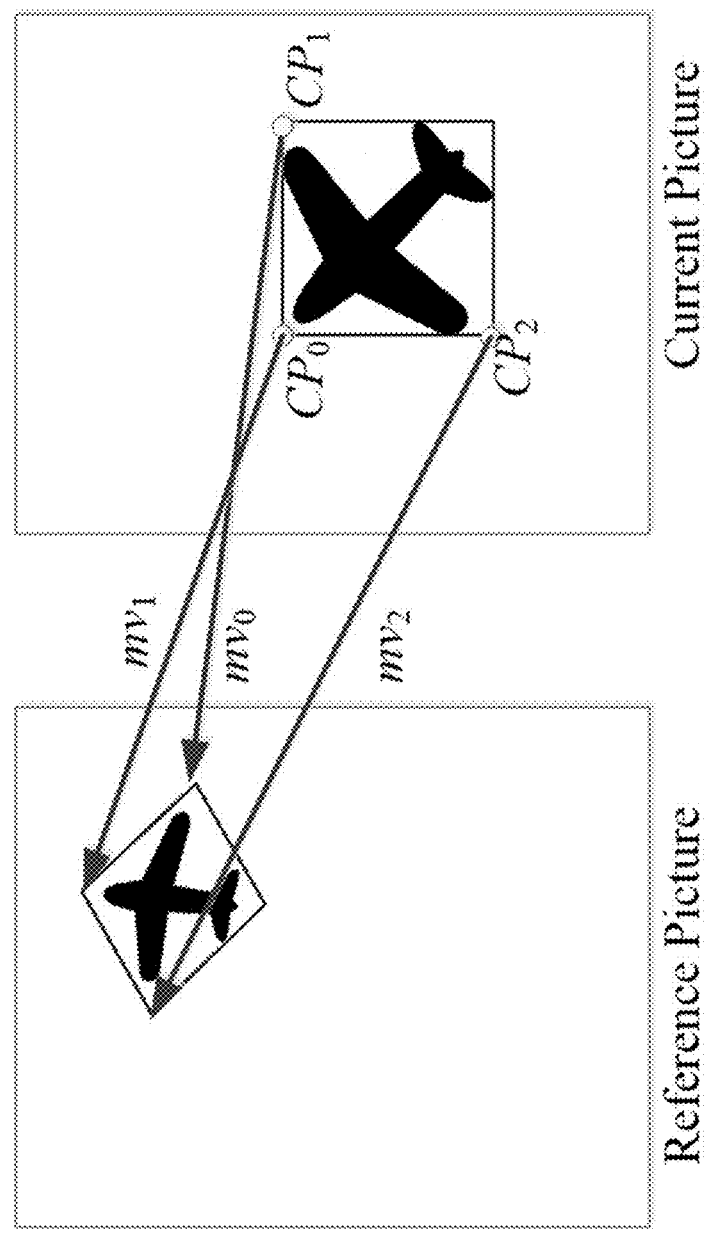

In HEVC, only a translation motion model is applied for motion compensation prediction (MCP). However, the camera and objects may have many kinds of motion, e.g. zoom in/out, rotation, perspective motions, and/or other irregular motions. In VVC, a simplified affine transform motion compensation prediction is applied with 4-parameter affine model and 6-parameter affine model. As shown in FIGS. 16A and 16B, the affine motion field of the block is described by two (in the 4-parameter affine model that uses the variables a, b, e and $f$) or three (in the 6-parameter affine model that uses the variables a, b, c, d, e and $f$) control point motion vectors, respectively.

The motion vector field (MVF) of a block is described by the following equation with the 4-parameter affine model and 6-parameter affine model respectively:

$$\begin{cases} mv^h(x, y) = ax - by + e = \dfrac{(mv_1^h - mv_0^h)}{w}x - \dfrac{(mv_1^v - mv_0^v)}{w}y + mv_0^h \\ mv^v(x, y) = bx + ay + f = \dfrac{(mv_1^v - mv_0^v)}{w}x + \dfrac{(mv_1^h - mv_0^h)}{w}y + mv_0^v \end{cases} \quad \text{Eq. (1)}$$

$$\begin{cases} mv^h(x, y) = ax + cy + e = \dfrac{(mv_1^h - mv_0^h)}{w}x + \dfrac{(mv_2^h - mv_0^h)}{w}y + mv_0^h \\ mv^v(x, y) = bx + dy + f = \dfrac{(mv_1^v - mv_0^v)}{w}x + \dfrac{(mv_2^v - mv_0^v)}{w}y + mv_0^v \end{cases} \quad \text{Eq. (2)}$$

Herein, $(mv^h_0, mv^h_0)$ is motion vector of the top-left corner control point (CP), and $(mv^h_1, mv^h_1)$ is motion vector of the top-right corner control point and $(mv^h_2, mv^h_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (e.g., 4×4 in VTM), the representative point is utilized to derive the motion vector for the whole sub-block.

Figure 17:
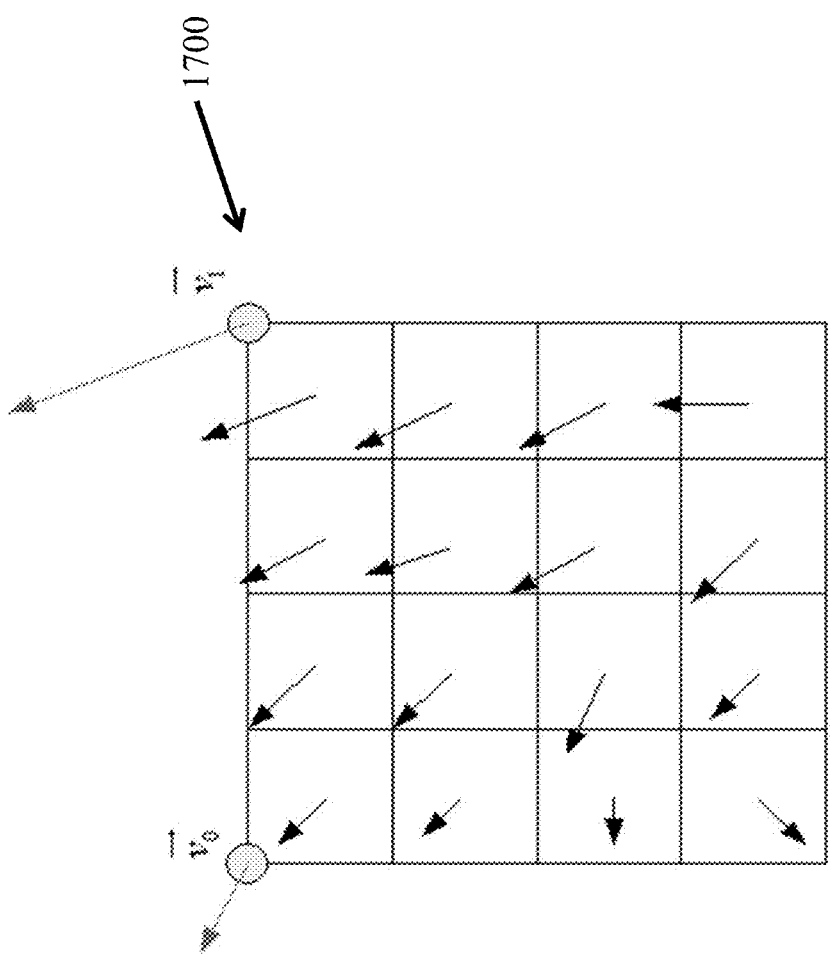
FIG. 17 shows an example of an affine motion vector field (MVF) per sub-block.

FIG. 17 shows an example of affine MVF per sub-block for a block 1700, wherein in order to further simplify the motion compensation prediction, sub-block based affine transform prediction is applied. To derive motion vector of each M×N sub-block, the motion vector of the center sample of each sub-block can be calculated according to Eqs. (1) and (2), and rounded to the motion vector fraction accuracy (e.g., 1/16 in JEM). Then the motion compensation interpolation filters can be applied to generate the prediction of each sub-block with derived motion vector. The interpolation filters for 1/16-pel are introduced by the affine mode. After the MCP, the high accuracy motion vector of each sub-block is rounded and saved as the same accuracy as the normal motion vector.

2.2.4 Examples for Signaling of Affine Prediction

Similar to the translational motion model, there are also two modes for signaling the side information due affine prediction. They are AFFINE_INTER and AFFINE_MERGE modes.

2.2.5 Examples of AF_INTER Mode

For CUs with both width and height larger than 8, AF_INTER mode can be applied. An affine flag in CU level is signaled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 20) and the estimated CPMVs are signalled. In addition, the index of affine AMVP candidate from which the estimated CPMVs are derived is further signalled.

1) Inherited Affine Motion Predictors

Figure 19:
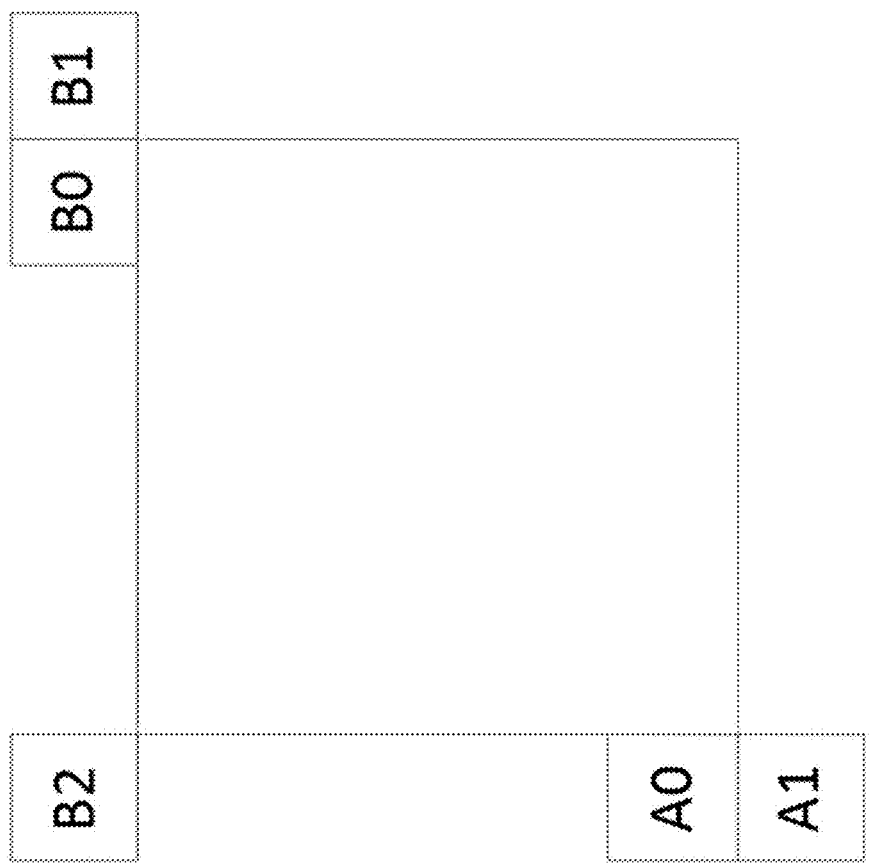
FIG. 19 shows an example of motion vector prediction for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 19.

Figure 21A:
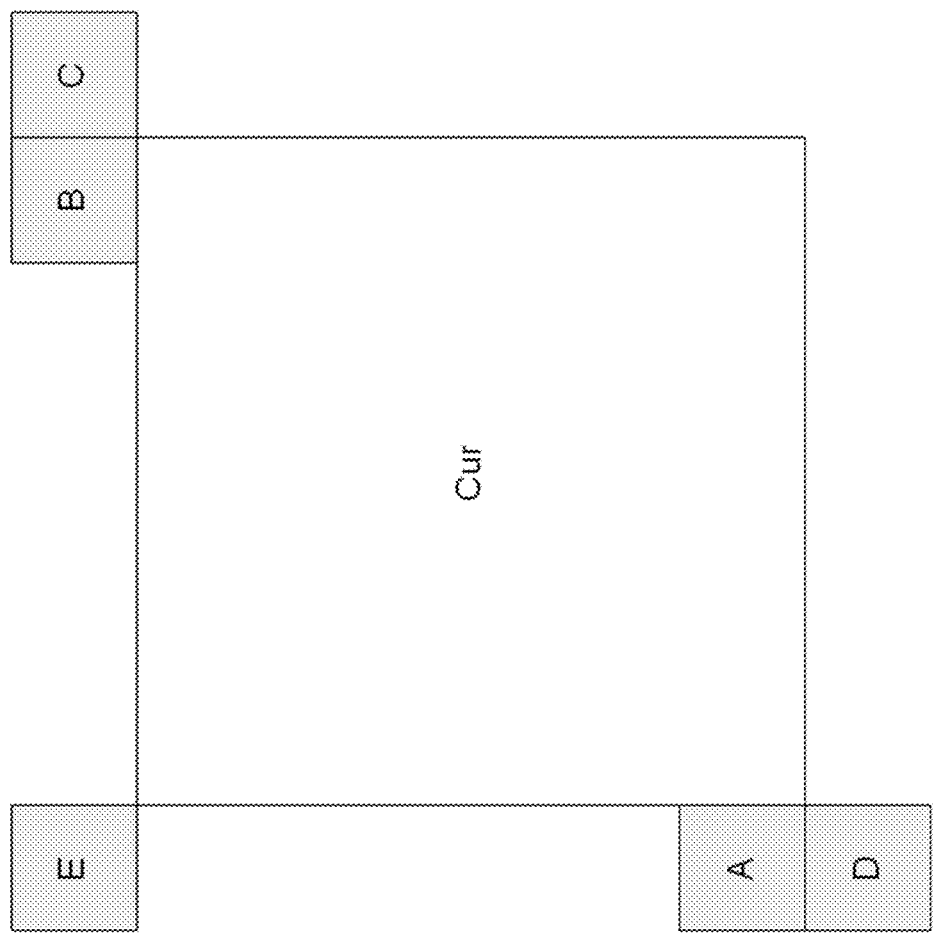
FIGS. 21A and 21B show example candidates for the AF_MERGE affine motion mode.
Figure 21B:
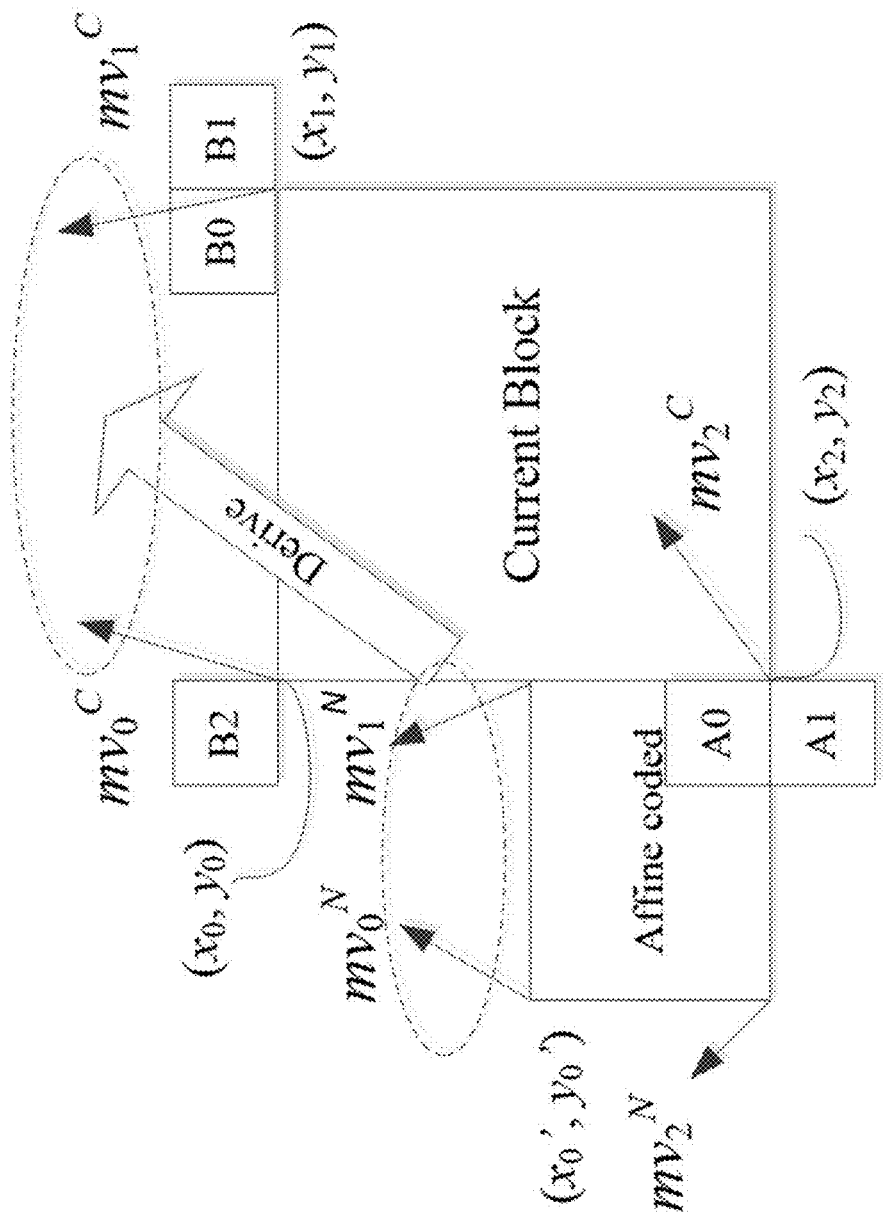
Figure 22:
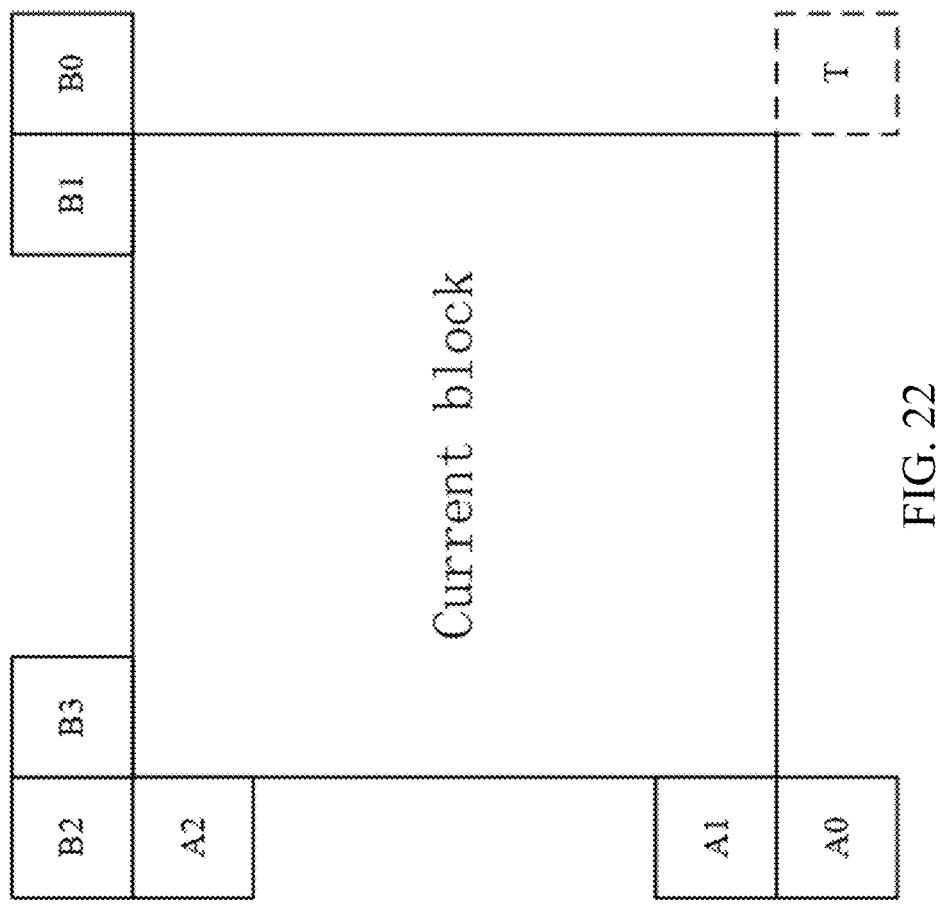
FIG. 22 shows an example of candidate positions for affine merge mode.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 21B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 20:
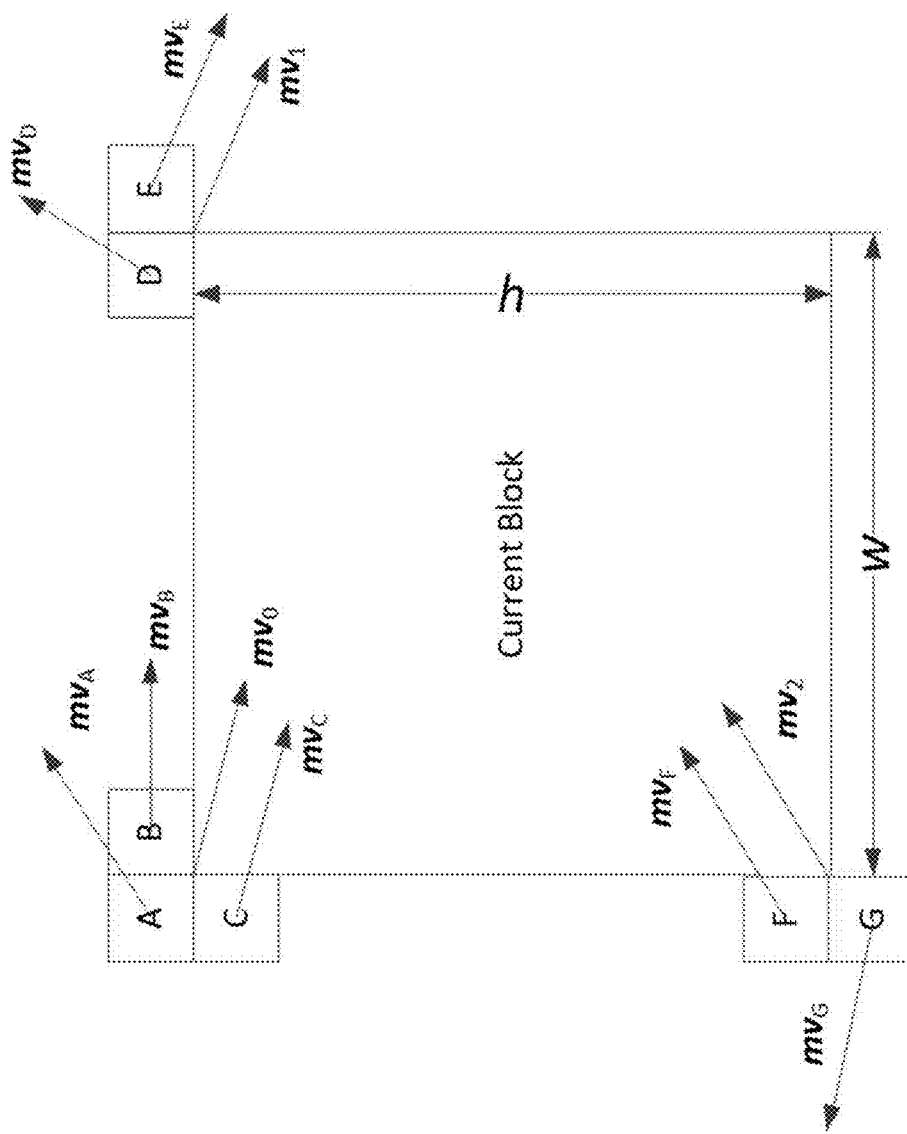
FIG. 20 shows an example of motion vector prediction for AF_INTER for constructed affine candidates.

A constructed affine motion predictor consists of control-point motion vectors (CPMVs) that are derived from neighboring inter coded blocks, as shown in FIG. 20, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_i$ is already derived in constructed affine motion predictor.

Figure 18B:
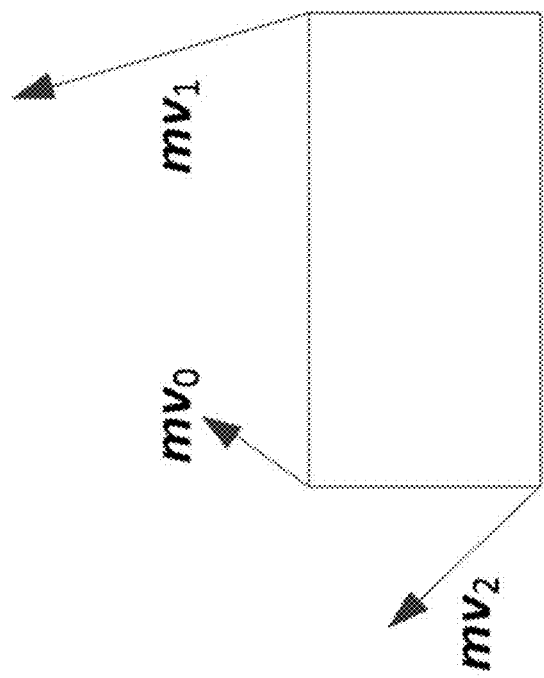
FIGS. 18A and 18B show examples of the 4-parameter and 6-parameter affine models, respectively.
Figure 18A:
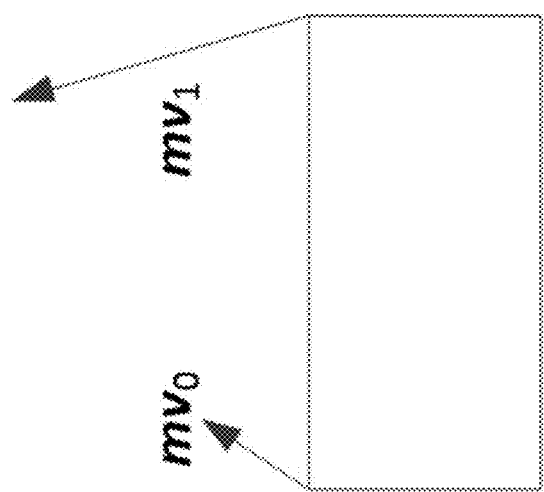

In AF_INTER mode, when 4/6 parameter affine mode is used, 2/3 control points are required, and therefore 2/3 MVD needs to be coded for these control points, as shown in FIGS. 18A and 18B. In an existing implementation, the MV may be derived as follows, e.g., it predicts $mvd_1$ and $mvd_2$ from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Herein, $\overline{mv}_i$, $mvd_1$ and $mv_1$ are the predicted motion vector, motion vector difference and motion vector of the top-left pixel (i=0), top-right pixel (i=1) or left-bottom pixel (i=2) respectively, as shown in FIG. 18B. In some embodiments, the addition of two motion vectors (e.g., mvA(xA, yA) and mvB(xB, yB)) is equal to summation of two components separately. For example, newMV=mvA+mvB implies that the two components of newMV are set to (xA+xB) and (yA+yB), respectively.

2.2.6 Examples of AF_MERGE Mode

When a CU is applied in AF_MERGE mode, it gets the first block coded with an affine mode from the valid neighboring reconstructed blocks. And the selection order for the candidate block is from left, above, above right, left bottom to above left as shown in FIG. 21A (denoted by A, B, C, D, E in order). For example, if the neighbour left bottom block is coded in affine mode as denoted by A0 in FIG. 21B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU v0 and v1 are computed according to the affine motion model in Eqs. (1) and (2), the MVF of the current CU can be generated. In order to identify whether the current CU is coded with AF_MERGE mode, an affine flag can be signaled in the bitstream when there is at least one neighboring block is coded in affine mode.

In some embodiments (e.g., JVET-L0142 and JVET-L0632), an affine merge candidate list may be constructed with following steps:

1) Insert Inherited Affine Candidates

Figure 24:
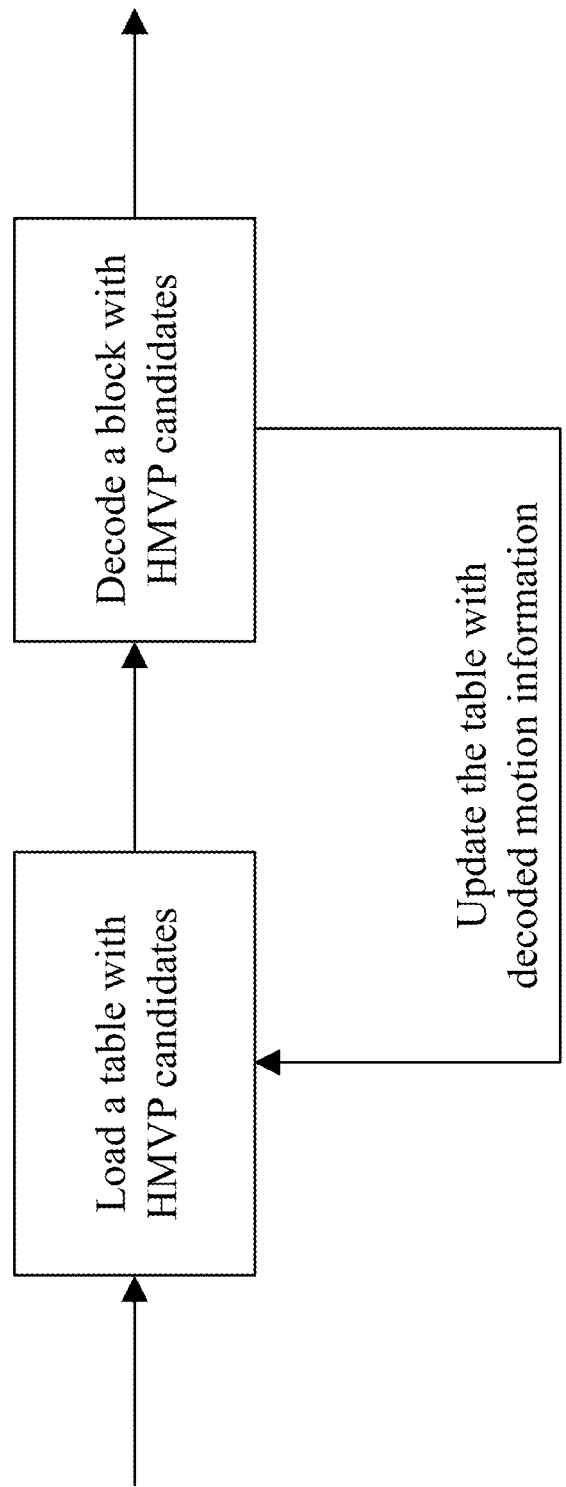
FIG. 24 shows an example of the coding flow for history-based motion vector prediction (HMVP) candidates.

Inherited affine candidate means that the candidate is derived from the affine motion model of its valid neighbor affine coded block. In the common base, as shown in FIG. 24, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 24. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with Zero Motion Vectors

If the number of candidates in affine merge candidate list is less than 5, zero motion vectors with zero reference indices are insert into the candidate list, until the list is full.

2.3 Examples of Current Picture Referencing (CPR)

Figure 23:
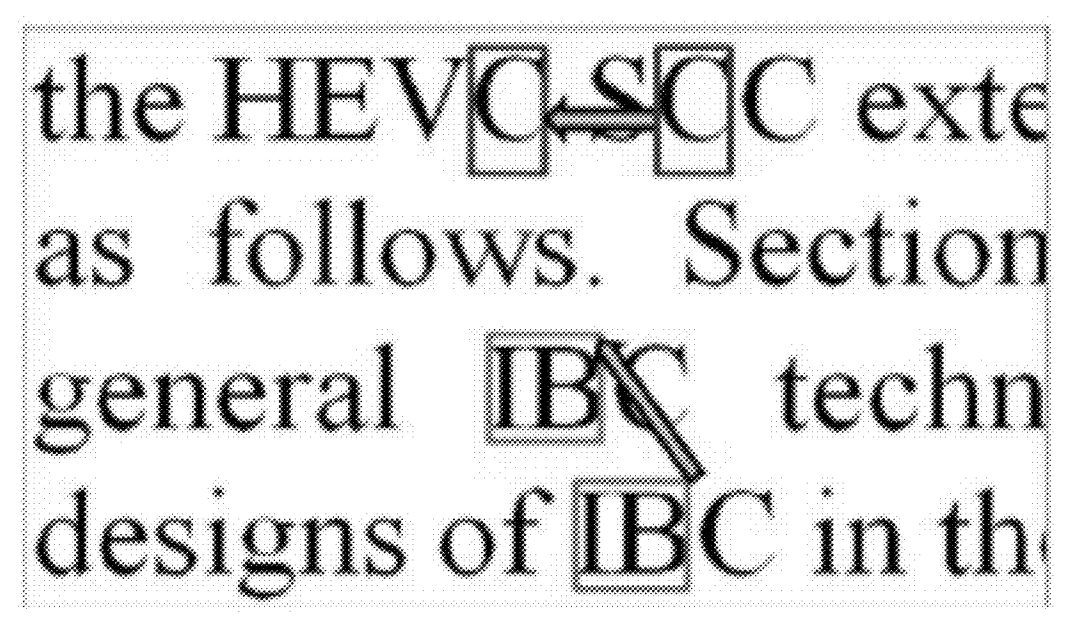

Intra block copy (IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency. An example of the intra block compensation is illustrated in FIG. 23.

Similar to the design of CRP in HEVC SCC, In VVC, The use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Some of the features of CPR include:

It is treated as a normal inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise an normal inter mode coded one with different pictures as reference pictures.

Block vector prediction and coding schemes for the IBC mode reuse the schemes used for motion vector prediction and coding in the HEVC inter mode (AMVP and MVD coding).

The motion vector for the IBC mode, also referred as block vector, is coded with integer-pel precision, but stored in memory in 1/16-pel precision after decoding as quarter-pel precision is required in interpolation and deblocking stages. When used in motion vector prediction for the IBC mode, the stored vector predictor will be right shifted by 4.

Search range: it is restricted to be within the current CTU.

CPR is disallowed when affine mode/triangular mode/GBI/weighted prediction is enabled.

2.4 Examples of Merge List Design in VVC

There are three different merge list construction processes supported in VVC:

(1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

(2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks. In some embodiments, the uni-prediction TPM merge list size is fixed to be 5.

(3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

JVET-L0278

In this contribution, the ATMVP merge candidate in the normal merge list is moved to the first position of the affine merge list. Such that all the merge candidates in the new list (i.e., sub-block based merge candidate list) are based on sub-block coding tools.

Regular Merge List

Different from the merge list design, in VVC, the history-based motion vector prediction (HMVP) method is employed.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new slice. Whenever there is an inter-coded block, the associated motion information is added to the last entry of the table as a new HMVP candidate. The overall coding flow is depicted in FIG. 24.

Figure 25:
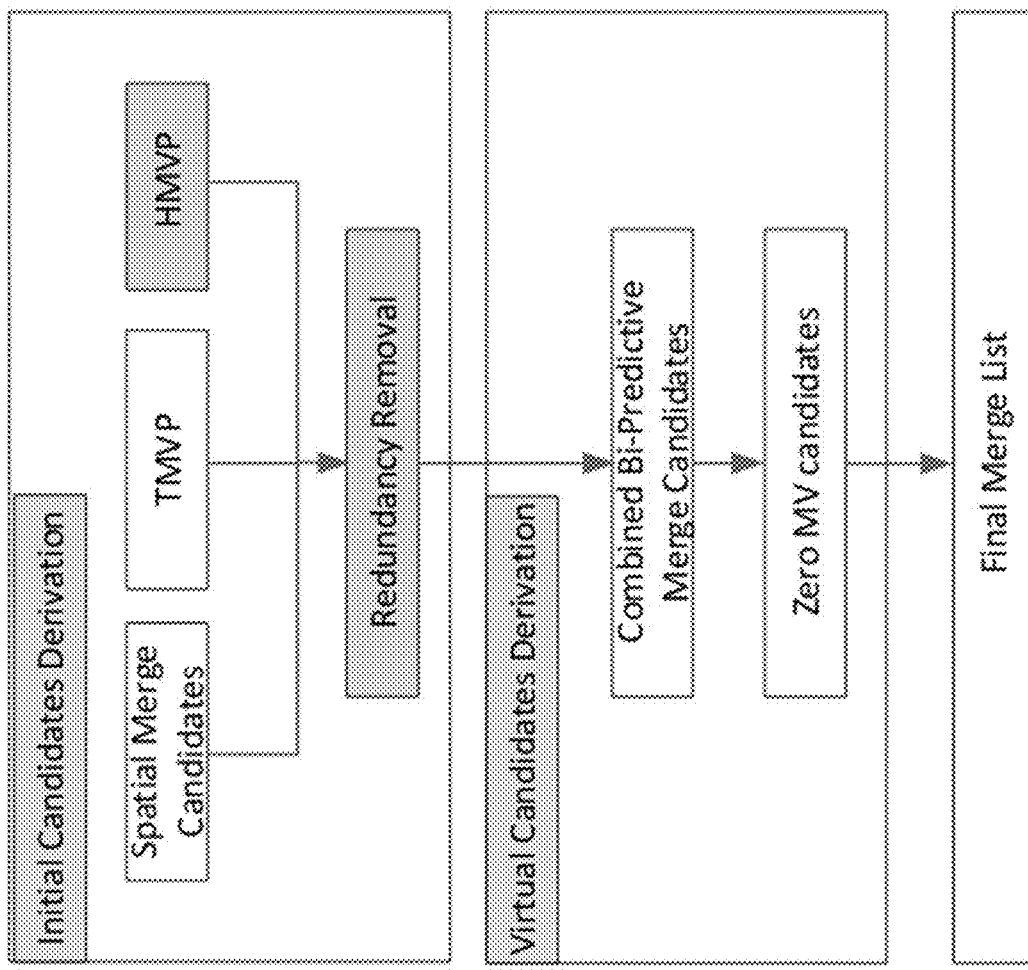
FIG. 25 shows an example of a modified merge list construction process.

HMVP candidates could be used in both AMVP and merge candidate list construction processes. FIG. 25 depicts the modified merge candidate list construction process (highlighted in grey). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

3 Drawbacks of Existing Implementations

In the existing VVC implementation, three different merge list are utilized with different procedures which increases the hardware implementation cost.

For all of the three merge lists, they need to access both spatial blocks and temporal blocks, e.g., loading motion information from spatial blocks and temporal blocks. However, loading motion information from temporal blocks typically requires much longer time which increase the critical path.

4 Example Methods for Separate Motion Candidate Lists for Video Coding

Embodiments of the presently disclosed technology overcome the drawbacks of existing implementations, thereby providing video coding with higher coding efficiencies. The construction of separate motion candidate lists for video coding, based on the disclosed technology, may enhance both existing and future video coding standards, is elucidated in the following examples described for various implementations. The examples of the disclosed technology provided below explain general concepts and are not meant to be interpreted as limiting. In an example, unless explicitly indicated to the contrary, the various features described in these examples may be combined. It should be noted that some of the proposed technologies could be applied to existing candidate list construction process.

Multiple Candidate Lists Based on where the Motion Information Originates

Example 1. A separate candidate list, named temporal candidate list, is constructed wherein motion information purely from spatial blocks are excluded.

(a) In one example, temporal candidate list is constructed wherein motion information only from temporal blocks (such motion information is added as temporal candidates) are taken into consideration.

(b) In one example, temporal candidate list may also include a candidate which requires to access both temporal blocks and spatial blocks, such as sub-block based STMVP or non-sub block based STMVP.

(c) In one example, the temporal merge candidate list may include affine merge candidates which use temporal neighbouring blocks information to derive the affine model.

(i) Alternatively, affine merge candidates which use temporal neighbouring blocks information to derive the affine model are in a separated merge candidate list.

(d) In one example, temporal candidate list may also include HMVP candidates.

(e) In one example, temporal candidate list may also include virtual candidates derived from temporal candidates and/or HMVP candidates.

(f) In one example, temporal candidate list may just include candidates wherein one candidate is only associated with one set of motion information applied to a whole block, such as TMVP.

(g) In one example, temporal candidate list may just include candidates wherein one candidate is only associated with multiple sets of motion information and each set is applied to a sub-block within the whole block, such as ATMVP.

(h) In one example, for all motion candidates that need to access temporal blocks, all of the temporal blocks are from the same reference picture. Alternatively, for all motion candidates that need to access temporal blocks, all of the temporal blocks are from one reference picture of each reference picture list.

(i) In one example, for all motion candidates that need to access temporal blocks, the picture where those temporal blocks are located may be pre-defined (e.g., reference index equal to 0) or signalled in SPS/PPS/Slice header/tile group header/tile/CTU/CU/PU.

(j) In one example, for all motion candidates that need to access temporal blocks, all of the temporal blocks are located in a collocated or the same CTU (coding tree unit) row as the current block.

(k) In one example, for all motion candidates that need to access temporal blocks, all of the temporal blocks are located in the same region (with size equal to M×N, e.g., M=N=64) when a video unit is split to non-overlapped M×N regions, where M and N may be pre-defined or signalled in SPS/PPS/Slice header/tile group header/tile/CTU/CU/PU.

(l) Alternatively, furthermore, generalized bi-prediction (GBi) is disabled for motion candidates in this list, where a GBi index is set to 0 for a motion candidate in a motion candidate list. GBi is also known as Bi-prediction with CU-level Weights (BCW)

Example 2. A separate candidate list, named spatial candidate list, is constructed wherein motion information from temporal blocks are excluded.

(a) In one example, spatial candidate list is constructed wherein motion information only from spatial blocks (such motion information is added as spatial candidates) are taken into consideration.

(b) In one example, spatial candidate list may also include HMVP candidates.

(c) In one example, spatial candidate list may also include virtual candidates derived from spatial candidates and/or HMVP candidates.

In some embodiments, a motion candidate list comprises a motion candidate based on both temporal blocks and spatial blocks. In some embodiments, a motion candidate is used for sub-block based spatial temporal motion vector prediction (STMVP) or non-sub block based STMVP.

Example 3. A separate candidate list, named CPR candidate list, is constructed wherein all candidates are associated with the same reference pictures.

(a) In one example, the same reference picture is defined as the current picture/tile/slice.

(b) In one example, all candidates are uni-prediction candidates. Alternatively, it is allowed to include both uni-prediction and bi-predication candidates, however, the reference picture is still the same for both reference picture lists.

(c) Such a candidate list may include motion information from spatial blocks (adjacent or non-adjacent).

(d) Such a candidate list may include some default motion candidates with motion vectors pre-defined or calculated based on the location of current block and/or based on the allowed search range of CPR mode (or IBC mode), and/or based on the maximumly allowed unit size of motion compensated block (e.g., 64×64).

Example 4. In one example, ATMVP is in a separated merge candidate list. ATMVP is also known as sub-block TMVP (SbTMVP)

(a) Alternatively, it is in the temporal merge candidate list but always holds a fixed position such as the first one.

In some embodiments, a motion candidate list for a video block of a video is constructed, where the motion candidate list comprises an ATMVP candidate but excludes an affine candidate.

Example 5. The list size of the temporal and/or spatial candidate list and/or other kinds of candidate lists (e.g., HMVP candidate list) may be pre-defined, e.g., equal to K (e.g., K=5 or 6). The pre-defined list size can describe a maximum number of allowed motion candidates in the first motion candidate list.

(a) Alternatively, separate signalling of the candidate list sizes may be used.

(b) Alternatively, the candidate list size may be signalled once and applied to all kinds of candidate lists.

(c) The signalling from encoder to decoder may be done in SPS/PPS/Slice header/tile group header/tile/CTU/CU/PU.

Example 6. It is proposed that a separate candidate list, named HMVP candidate list is constructed, wherein only HMVP candidates are included in the list.

(a) Alternatively, furthermore, some default motion vector candidates (e.g., zero motion vector candidates) may be included too.

(b) Alternatively, furthermore, some candidates derived from existing HMVP candidates may also be included.

Example 7. When there are multiple candidate lists, a list index may be further signalled.

(a) In one example, the neighboring blocks' list index may be utilized for coding the list index of current block, such as used for context.

(b) The same value of signaled list index may correspond to different merge list for different blocks.

(c) The signalling of list index may be dependent on the coded mode information, such as TPM, non-affine and non-TPM modes.

In some embodiments, based on a mode, a usage of multiple motion candidate lists can be determined using multiple motion candidate list construction methods or just one motion candidate list using one motion candidate list construction method. In some embodiments, based on a mode, the first motion candidate list construction method can be determined to be enabled for the first video block during a conversion between a video block and a bitstream representation of a video including the video block.

Example 8. Pruning operation may be conducted between different candidate list.

(a) One candidate may not be inserted into one candidate list if it is identical or similar to a candidate in another candidate list.

Example 9. The above methods may be applicable to certain modes.

(a) When it is disabled for a mode, the merge list index is not signalled.

(b) In one example, separate candidate lists may be utilized for the merge mode, but not for the AMVP mode.

(c) In one example, separate candidate lists may be disabled for the TPM mode. That is, only one list is constructed for the TPM coded blocks.

(d) The above methods may be applicable to certain block sizes. Suppose W and H are the block width and height, respectively, the above methods may be applied when (i) W*H is equal to and/or larger than a threshold (e.g., 64).

(ii) W>=T0 and/or H>=T1, e.g., T0 and T1 are both set to 16.

The examples described above may be incorporated in the context of the method described below, e.g., method(s) 2600A to 2600E, which may be implemented at a video decoder or a video encoder.

Figure 26A:
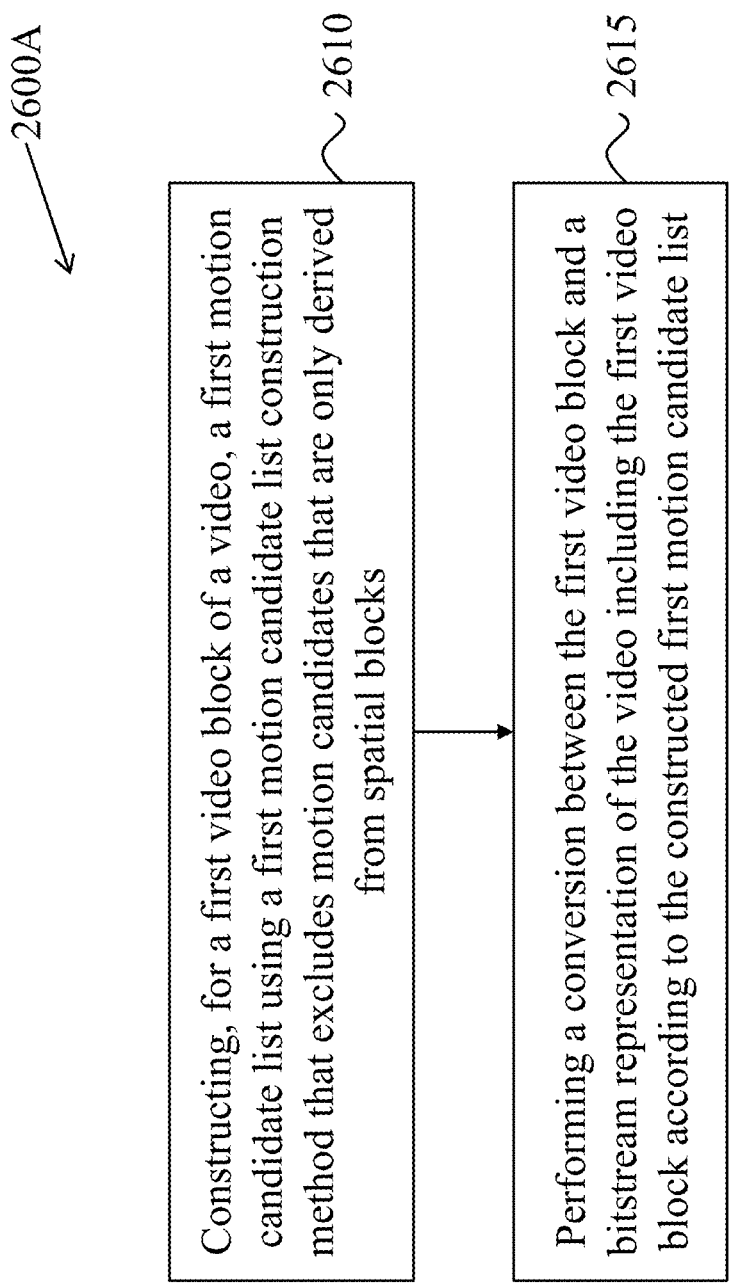
FIGS. 26A to 26E shows flowcharts of example methods for video coding.

FIG. 26A shows a first flowchart of an exemplary method 2600A for video processing. At operation 2610, a first motion candidate list is constructed for a first video block of a video using a first motion candidate list construction method that excludes motion candidates that are only derived from spatial blocks. At operation 2615, a conversion is performed between the first video block and a bitstream representation of the video including the first video block according to the constructed first motion candidate list.

In some embodiments for method 2600A, the first motion candidate list comprises a motion candidate from only temporal blocks. In some embodiments for method 2600A, the first motion candidate list comprises a motion candidate based on both temporal blocks and spatial blocks. In some embodiments for method 2600A, the motion candidate is used for sub-block based spatial temporal motion vector prediction (STMVP) or non-sub block based STMVP. In some embodiments for method 2600A, the first motion candidate list comprises an affine merge candidate that uses information from temporally neighboring video blocks of the first video block to derive an affine model.

In some embodiments for method 2600A, the first motion candidate list excludes an affine merge candidate that uses information from temporally neighboring video blocks of the first video block to derive an affine model. In some embodiments for method 2600A, the first motion candidate list comprises a history-based motion vector prediction (HMVP) candidate. In some embodiments for method 2600A, the first motion candidate list comprises a virtual candidate derived from a temporal motion candidate or a history-based motion vector prediction (HMVP) candidate. In some embodiments for method 2600A, the first motion candidate list comprises only motion candidates, where each motion candidate is only associated with a single set of motion information that is applied to an entirety of the first video block.

In some embodiments for method 2600A, the first motion candidate list comprises only motion candidates, where each motion candidate is only associated with multiple sets of motion information, and where each of the multiple sets of motion information is applied to a sub-block of the first video block. In some embodiments for method 2600A, the first motion candidate list comprises a plurality of motion candidates that are associated with a plurality of temporal blocks of a same reference picture. In some embodiments for method 2600A, the first motion candidate list comprises a plurality of motion candidates that are associated with a plurality of temporal blocks that are associated with one reference picture of each reference picture list.

In some embodiments for method 2600A, the first motion candidate list comprises a plurality of motion candidates that are associated with a plurality of temporal blocks that are located in a picture, where a reference index of the picture is pre-defined or signaled in a sequence parameter set (SPS), a picture parameter set (PPS), a slice header, a tile group header, a tile, a coding tree unit (CTU), a coding unit (CU) or a prediction unit (PU). In some embodiments for method 2600A, the first motion candidate list comprises a plurality of motion candidates that are associated with a plurality of temporal blocks that are is located in a collated coding tree unit (CTU) row that comprises the first video block.

In some embodiments for method 2600A, the first motion candidate list comprises a plurality of motion candidates that are associated with a plurality of temporal block that are located in a same region of size M×N when a video unit is split to non-overlapped M×N regions, and where M and N are integers that are pre-defined or signaled in a sequence parameter set (SPS), a picture parameter set (PPS), a slice header, a tile group header, a tile, a coding tree unit (CTU), a coding unit (CU) or a prediction unit (PU). In some embodiments for method 2600A, generalized bi-prediction (GBi) is disabled for motion candidates in the first motion candidate list, where a GBi index is set to 0 for a motion candidate in the first motion candidate list. In some embodiments for method 2600A, the first motion candidate list comprises an alternative temporal motion vector prediction (ATMVP) candidate. In some embodiments for method 2600A, the ATMVP candidate is located at a fixed position in the first motion candidate list.

Figure 26B:
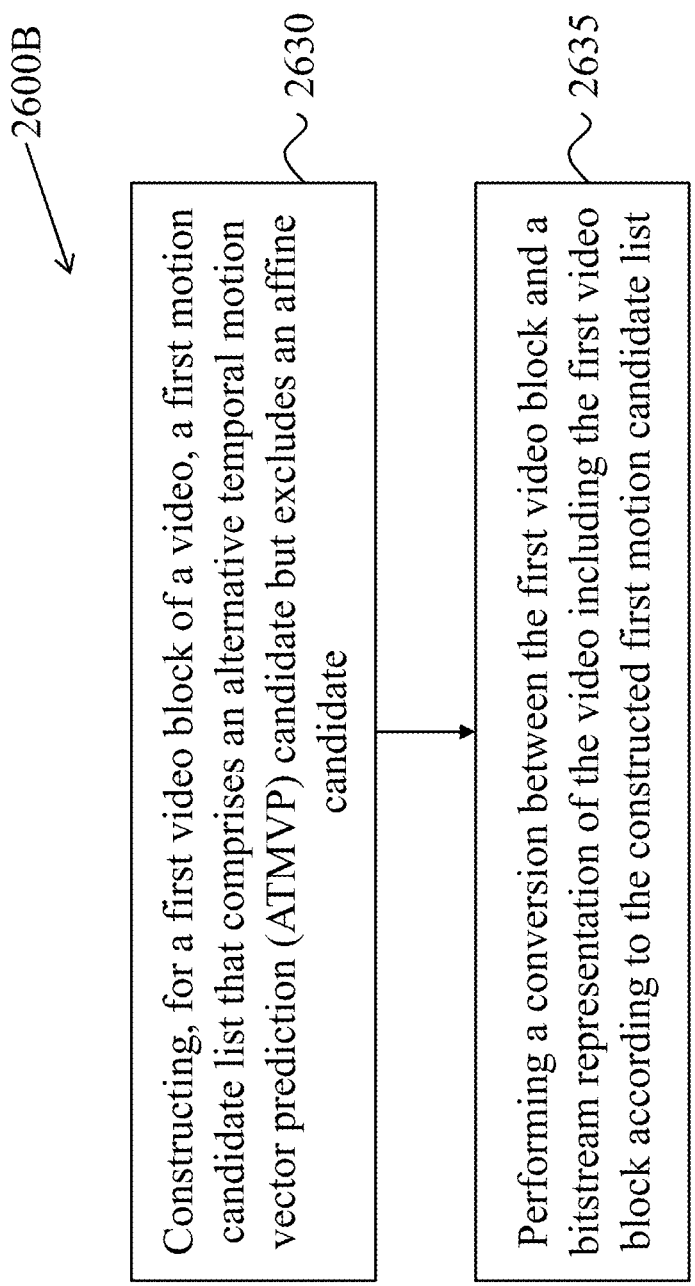

FIG. 26B shows a second flowchart of an exemplary method 2600B for video processing. At operation 2630, a first motion candidate list that comprises an alternative temporal motion vector prediction (ATMVP) candidate but excludes an affine candidate is constructed for a first video block of a video. At operation 2635, a conversion is performed between the first video block and a bitstream representation of the video including the first video block according to the constructed first motion candidate list.

In some embodiments for method(s) 2600A and/or 2600B, the method further includes constructing a second motion candidate list using a second motion candidate list construction method that is different from the first motion candidate list construction method for the first video block. In some embodiments for method(s) 2600A and/or 2600B, the bitstream representation includes a list index that identifies a list within a set of multiple motion candidate lists corresponding to multiple motion candidate list construction methods that include the first and second motion candidate list construction methods. In some embodiments for method(s) 2600A and/or 2600B, a first list index corresponds to a neighboring video block of the first video block is used to code a second list index of the first video block.

In some embodiments for method(s) 2600A and/or 2600B, the first list index corresponds to a neighboring video block of the first video block is used in a context selection for coding the second list index of the first video block. In some embodiments for method(s) 2600A and/or 2600B, a same value for the list index corresponds to different motion candidate list construction method for different video blocks of the video.

In some embodiments for method(s) 2600A and/or 2600B, a signaling of the list index is based on a coded mode information that includes a triangular prediction mode (TPM), a non-affine mode, or non-TPM mode. In some embodiments for method(s) 2600A and/or 2600B, the method further includes performing a pruning operation on the motion candidates in different motion candidate lists in the multiple motion candidate lists. In some embodiments for method(s) 2600A and/or 2600B, the method further includes, based on a mode, determining a usage of multiple motion candidate lists using multiple motion candidate list construction methods or just one motion candidate list using one motion candidate list construction method.

In some embodiments for method(s) 2600A and/or 2600B, when the usage of multiple motion candidate lists using multiple motion candidate list construction methods is disabled, a list index for the first motion candidate list is disabled for a mode and not signaled. In some embodiments for method(s) 2600A and/or 2600B, the method further includes based on a mode, determining that the first motion candidate list construction method for the first video block is enabled. In some embodiments for method(s) 2600A and/or 2600B, the mode is a merge mode. In some embodiments for method(s) 2600A and/or 2600B, the mode is an advanced motion vector prediction (AMVP) mode. In some embodiments for method(s) 2600A and/or 2600B, the mode is a triangular prediction mode (TPM) mode. In some embodiments for method(s) 2600A and/or 2600B, the mode is related to block dimension. In some embodiments for method(s) 2600A and/or 2600B, the block dimension includes a product of a height and a width of the first video block is greater than or equal to a threshold. In some embodiments for method(s) 2600A and/or 2600B, the threshold is 64.

In some embodiments for method(s) 2600A and/or 2600B, a height of the first video block is greater than or equal to a first threshold and where a width of the first video block is greater than or equal to a second threshold. In some embodiments for method(s) 2600A and/or 2600B, the first threshold is 16 and the second threshold is 16. In some embodiments for method(s) 2600A and/or 2600B, the first motion candidate list comprises a single motion candidate list for video blocks coded with the mode. In some embodiments for method(s) 2600A and/or 2600B, the first motion candidate list comprises a single motion candidate list for video blocks not coded with the mode. In some embodiments for method(s) 2600A and/or 2600B, the performing the conversion comprises generating pixel values of the first video block from the bitstream representation. In some embodiments for method(s) 2600A and/or 2600B, the performing the conversion comprises generating the bitstream representation from pixel values of the first video block.

Figure 26C:
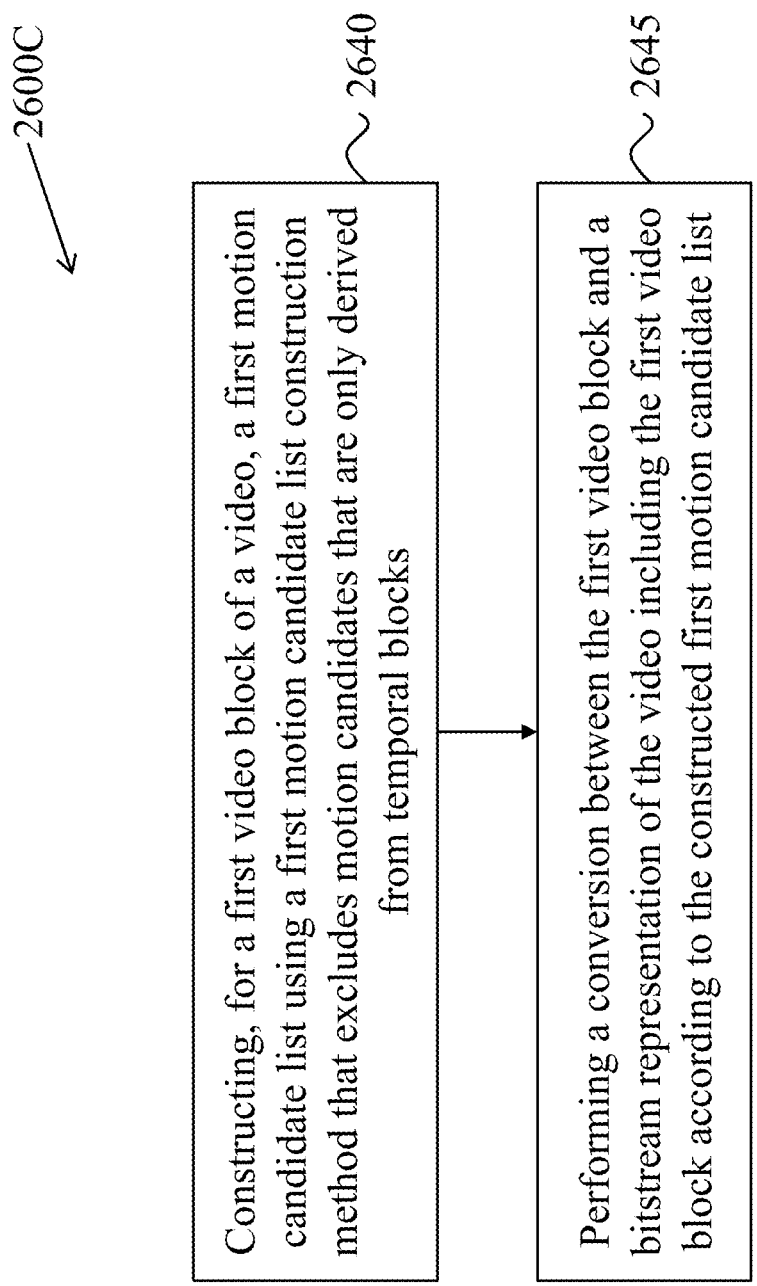

FIG. 26C shows a third flowchart of an exemplary method 2600C for video processing. At operation 2640, a first motion candidate list is constructed for a first video block of a video using a first motion candidate list construction method that excludes motion candidates that are only derived from temporal blocks. At operation 2645, a conversion is performed between the first video block and a bitstream representation of the video including the first video block according to the constructed first motion candidate list.

In some embodiments for method 2600C, the first motion candidate list comprises a motion candidate from only spatial blocks. In some embodiments for method 2600C, the first motion candidate list comprises a history-based motion vector prediction (HMVP) candidate. In some embodiments for method 2600C, the first motion candidate list comprises a virtual candidate derived from a spatial motion candidate or the HMVP candidate. In some embodiments for method 2600C, the first motion candidate list comprises a motion candidate based on both temporal blocks and spatial blocks.

In some embodiments for method 2600C, the motion candidate is used for sub-block based spatial temporal motion vector prediction (STMVP) or non-sub block based STMVP. In some embodiments for method 2600C, a list size of the first motion candidate list is a pre-defined maximum number of allowed motion candidates in the first motion candidate list. In some embodiments for method 2600C, the list size is 5 or 6. In some embodiments for method 2600C, a first list size of the first motion candidate list using the first motion candidate list construction method or a second list size of at least one more motion candidate list using a second motion candidate list construction method are separately signaled.

In some embodiments for method 2600C, a first list size of the first motion candidate list using the first motion candidate list construction method or a second list size of at least one more motion candidate list using a second motion candidate list construction method are signaled once and applied to multiple types of motion candidate lists comprising the first motion candidate list and the at least one more motion candidate list. In some embodiments for method 2600C, a first list size of the first motion candidate list using the first motion candidate list construction method or a second list size of at least one more motion candidate list using a second motion candidate list construction method are signaled using a sequence parameter set (SPS), a picture parameter set (PPS), a slice header, a tile group header, a tile, a coding tree unit (CTU), a coding unit (CU) or a prediction unit (PU).

In some embodiments for method 2600C, the at least one more motion candidate list is a temporal candidate list or a spatial candidate list or a history-based motion vector prediction (HMVP) candidate list. In some embodiments for method 2600C, the method further comprises constructing a second motion candidate list using a second motion candidate list construction method that is different from the first motion candidate list construction method for the first video block.

In some embodiments for method 2600C, the second motion candidate list is a temporal candidate list that excludes motion candidates derived from only a spatial neighboring block or a history-based motion vector prediction (HMVP) candidate list that excludes motion candidates derived from only a spatial or temporal neighboring block. In some embodiments for method 2600C, the bitstream representation includes a list index that identifies a list within a set of multiple motion candidate lists corresponding to multiple motion candidate list construction methods that include the first and second motion candidate list construction methods.

In some embodiments for method 2600C, the method further comprises, based on a mode, determining a usage of multiple motion candidate lists using multiple motion candidate list construction methods or just one motion candidate list using one motion candidate list construction method. In some embodiments for method 2600C, when a usage of the multiple motion candidate lists using the multiple motion candidate list construction methods is disabled, a list index for the first motion candidate list is disabled for a mode and not signaled.

In some embodiments for method 2600C, the method further comprises, based on a mode, determining that the first motion candidate list construction method for the first video block is enabled. In some embodiments for method 2600C, the mode is a merge mode. In some embodiments for method 2600C, the mode is an advanced motion vector prediction (AMVP) mode. In some embodiments for method 2600C, the mode is a triangular prediction mode (TPM) mode. In some embodiments for method 2600C, the mode is related to block dimension.

In some embodiments for method 2600C, the block dimension includes a product of a height and a width of the first video block is greater than or equal to a threshold. In some embodiments for method 2600C, the threshold is 64. In some embodiments for method 2600C, a height of the first video block is greater than or equal to a first threshold and where a width of the first video block is greater than or equal to a second threshold. In some embodiments for method 2600C, the first threshold is 16 and the second threshold is 16. In some embodiments for method 2600C, the first motion candidate list comprises a single motion candidate list for video blocks coded with the mode.

In some embodiments for method 2600C, the first motion candidate list comprises a single motion candidate list for video blocks not coded with the mode. In some embodiments for method 2600C, the performing the conversion comprises generating pixel values of the first video block from the bitstream representation. In some embodiments for method 2600C, the performing the conversion comprises generating the bitstream representation from pixel values of the first video block.

Figure 26D:
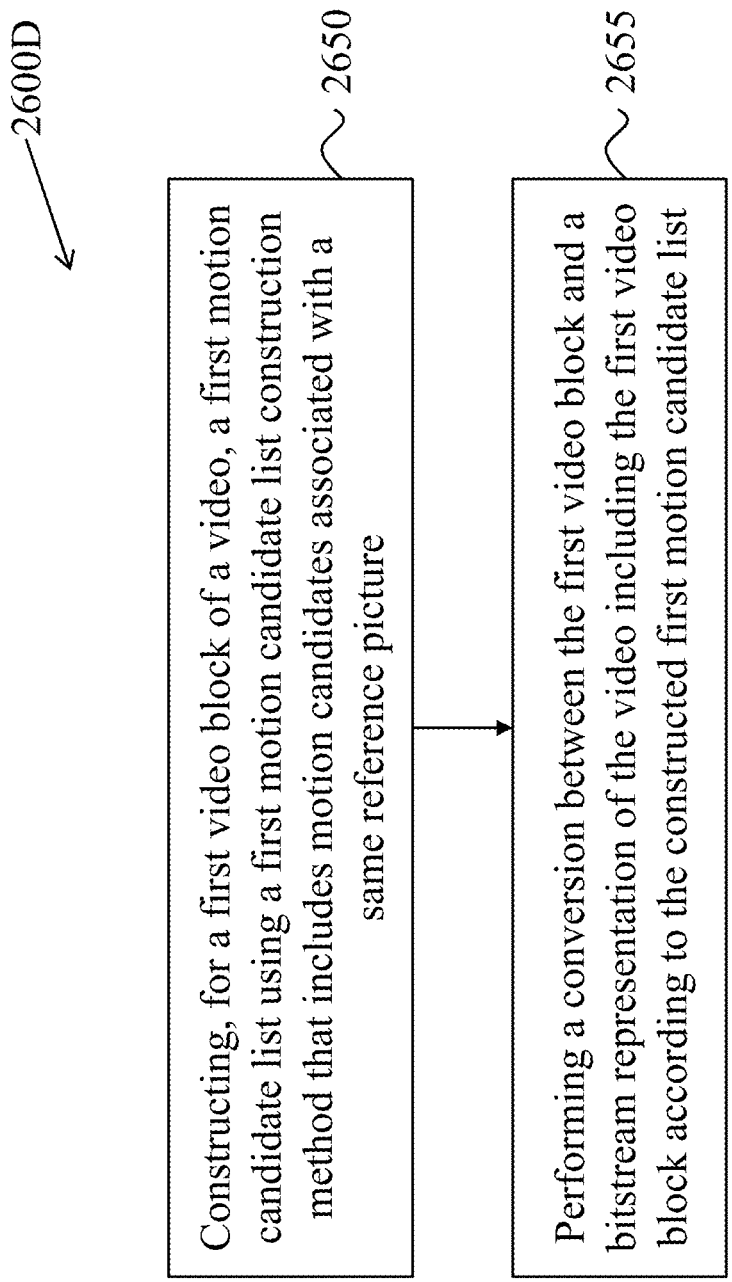

FIG. 26D shows a fourth flowchart of an exemplary method 2600D for video processing. At operation 2650 a first motion candidate list is constructed for a first video block of a video using a first motion candidate list construction method that includes motion candidates associated with a same reference picture. At operation 2655, a conversion is performed between the first video block and a bitstream representation of the video including the first video block according to the constructed first motion candidate list.

In some embodiments for method 2600D, the first motion candidate list is an intra block copy (IBC) list. In some embodiments for method 2600D, the same reference picture is a current picture, or a current tile, or a current slice, where the first video block belongs to the current picture, the current tile, or the current slice. In some embodiments for method 2600D, each of the motion candidates is a uni-prediction candidate. In some embodiments for method 2600D, the motion candidates include a uni-prediction candidate and a bi-prediction candidate, and where the uni-prediction candidate and the bi-direction candidate use the same reference picture for both reference picture lists.

In some embodiments for method 2600D, the first motion candidate list includes a motion candidate with motion information from spatial blocks. In some embodiments for method 2600D, the spatial blocks are adjacent or non-adjacent to the first video block. In some embodiments for method 2600D, the motion candidates include a history-based motion vector prediction (HMVP) candidate. In some embodiments for method 2600D, the first motion candidate list includes at least one default motion candidate with pre-defined or calculated motion vectors. In some embodiments for method 2600D, the pre-defined or calculated motion vectors are based on any one or more of (1) a location of the first video block, (2) an allowed search range of an intra block copy (IBC) mode, and (3) a maximally allowed unit size of a motion compensated block.

In some embodiments for method 2600D, the maximally allowed unit size of the motion compensated block is 64×64 pixels. In some embodiments for method 2600D, a list size of the first motion candidate list is a pre-defined maximum number of allowed motion candidates in the first motion candidate list. In some embodiments for method 2600D, the list size is 5 or 6. In some embodiments for method 2600D, a first list size of the first motion candidate list using the first motion candidate list construction method or a second list size of at least one more motion candidate list using a second motion candidate list construction method are separately signaled.

In some embodiments for method 2600D, a first list size of the first motion candidate list using the first motion candidate list construction method or a second list size of at least one more motion candidate list using a second motion candidate list construction method are signaled once and applied to multiple types of motion candidate lists comprising the first motion candidate list and the at least one more motion candidate list. In some embodiments for method 2600D, a first list size of the first motion candidate list using the first motion candidate list construction method or a second list size of at least one more motion candidate list using a second motion candidate list construction method are signaled using a sequence parameter set (SPS), a picture parameter set (PPS), a slice header, a tile group header, a tile, a coding tree unit (CTU), a coding unit (CU) or a prediction unit (PU).

In some embodiments for method 2600D, the at least one more motion candidate list is a temporal candidate list that excludes motion candidates derived from only a spatial neighboring block or a spatial candidate list that excludes motion candidates derived from only a temporal neighboring block or a history-based motion vector prediction (HMVP) candidate list that excludes motion candidates derived from only a temporal or spatial neighboring block and includes a HMVP candidate. In some embodiments for method 2600D, the method further includes constructing a second motion candidate list using a second motion candidate list construction method that is different from the first motion candidate list construction method for the first video block. In some embodiments for method 2600D, the second motion candidate list is a temporal candidate list that excludes motion candidates derived from only a spatial neighboring block or a HMVP candidate list that excludes motion candidates derived from only a spatial or temporal neighboring block In some embodiments for method 2600D, the bitstream representation includes a list index that identifies a list within a set of multiple motion candidate lists corresponding to multiple motion candidate list construction methods that include the first and second motion candidate list construction methods. In some embodiments for method 2600D, the method further includes, based on a mode, determining a usage of multiple motion candidate lists using multiple motion candidate list construction methods or just one motion candidate list using one motion candidate list construction method.

In some embodiments for method 2600D, when a usage of the multiple motion candidate lists using the multiple motion candidate list construction methods is disabled, a list index for the first motion candidate list is disabled for a mode and not signaled. In some embodiments for method 2600D, the method further includes, based on a mode, determining that the first motion candidate list construction method for the first video block is enabled. In some embodiments for method 2600D, the mode is a merge mode. In some embodiments for method 2600D, the mode is an advanced motion vector prediction (AMVP) mode. In some embodiments for method 2600D, the mode is a triangular prediction mode (TPM) mode.

In some embodiments for method 2600D, the mode is related to block dimension. In some embodiments for method 2600D, the block dimension includes a product of a height and a width of the first video block is greater than or equal to a threshold. In some embodiments for method 2600D, the threshold is 64. In some embodiments for method 2600D, a height of the first video block is greater than or equal to a first threshold and where a width of the first video block is greater than or equal to a second threshold. In some embodiments for method 2600D, the first threshold is 16 and the second threshold is 16.

In some embodiments for method 2600D, the first motion candidate list comprises a single motion candidate list for video blocks coded with the mode. In some embodiments for method 2600D, the first motion candidate list comprises a single motion candidate list for video blocks not coded with the mode. In some embodiments for method 2600D, the performing the conversion comprises generating pixel values of the first video block from the bitstream representation. In some embodiments for method 2600D, the performing the conversion comprises generating the bitstream representation from pixel values of the first video block.

Figure 26E:
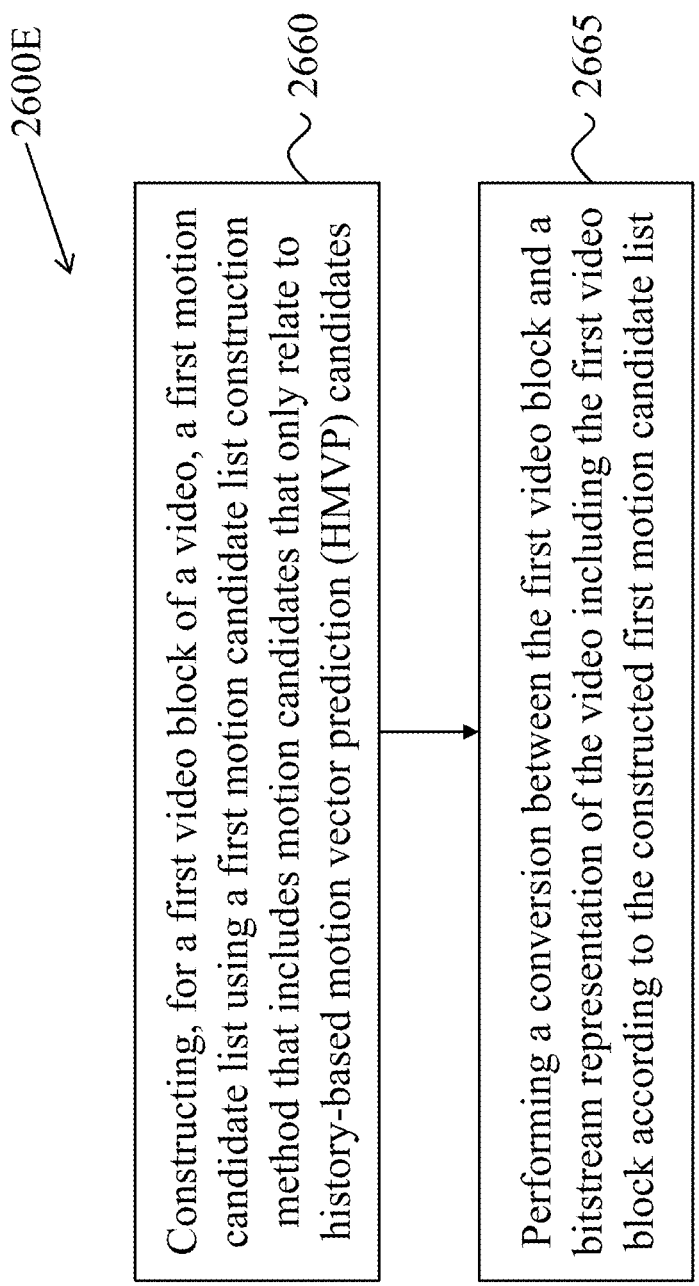

FIG. 26E shows a fifth flowchart of an exemplary method 2600E for video processing. At operation 2660, a first motion candidate list for a first video block of a video is constructed using a first motion candidate list construction method that includes motion candidates that only relate to history-based motion vector prediction (HMVP) candidates. At operation 2665, a conversion is performed between the first video block and a bitstream representation of the video including the first video block according to the constructed first motion candidate list.

In some embodiments for method 2600E, the first motion candidate list comprises a default motion vector candidate. In some embodiments for method 2600E, the default motion vector candidate includes a zero motion vector candidate. In some embodiments for method 2600E, the first motion candidate list comprises candidates derived from existing HMVP candidates. In some embodiments for method 2600E, a list size of the first motion candidate list is a pre-defined maximum number of allowed motion candidates in the first motion candidate list. In some embodiments for method 2600E, the list size is 5 or 6. In some embodiments for method 2600E, a first list size of the first motion candidate list using the first motion candidate list construction method or a second list size of at least one more motion candidate list using a second motion candidate list construction method are separately signaled.

In some embodiments for method 2600E, a first list size of the first motion candidate list using the first motion candidate list construction method or a second list size of at least one more motion candidate list using a second motion candidate list construction method are signaled once and applied to multiple types of motion candidate lists comprising the first motion candidate list and the at least one more motion candidate list. In some embodiments for method 2600E, a first list size of the first motion candidate list using the first motion candidate list construction method or a second list size of at least one more motion candidate list using a second motion candidate list construction method are signaled using a sequence parameter set (SPS), a picture parameter set (PPS), a slice header, a tile group header, a tile, a coding tree unit (CTU), a coding unit (CU) or a prediction unit (PU).

In some embodiments for method 2600E, the at least one more motion candidate list is a temporal candidate list that excludes motion candidates derived from only a spatial neighboring block or a spatial candidate list that excludes motion candidates derived from only a temporal neighboring block or a history-based motion vector prediction (HMVP) candidate list that excludes motion candidates derived from only a temporal or spatial neighboring block and includes a HMVP candidate. In some embodiments for method 2600E, the method further includes constructing a second motion candidate list using a second motion candidate list construction method that is different from the first motion candidate list construction method for the first video block.

In some embodiments for method 2600E, the second motion candidate list is a temporal candidate list that excludes motion candidates derived from only a spatial neighboring block or a HMVP candidate list that excludes motion candidates derived from only a spatial or temporal neighboring block. In some embodiments for method 2600E, the bitstream representation includes a list index that identifies a list within a set of multiple motion candidate lists corresponding to multiple motion candidate list construction methods that include the first and second motion candidate list construction methods. In some embodiments for method 2600E, the method further includes, based on a mode, determining a usage of multiple motion candidate lists using multiple motion candidate list construction methods or just one motion candidate list using one motion candidate list construction method. In some embodiments for method 2600E, when a usage of the multiple motion candidate lists using the multiple motion candidate list construction methods is disabled, a list index for the first motion candidate list is disabled for a mode and not signaled.

In some embodiments for method 2600E, the method further includes, based on a mode, determining that the first motion candidate list construction method for the first video block is enabled. In some embodiments for method 2600E, the mode is a merge mode.

In some embodiments for method 2600E, the mode is an advanced motion vector prediction (AMVP) mode. In some embodiments for method 2600E, the mode is a triangular prediction mode (TPM) mode. In some embodiments for method 2600E, based on an intra block copy (IBC) mode, generating a motion vector for the first video block, where the IBC mode uses a current picture, or a current tile, or a current slice including the first video block as a reference picture. In some embodiments for method 2600E, the mode is related to block dimension. In some embodiments for method 2600E, the block dimension includes a product of a height and a width of the first video block is greater than or equal to a threshold. In some embodiments for method 2600E, the block dimension includes a product of a height and a width of the first video block is less than a threshold. In some embodiments for method 2600E, the threshold is 16 or 64.

In some embodiments for method 2600E, a height of the first video block is greater than or equal to a first threshold and where a width of the first video block is greater than or equal to a second threshold. In some embodiments for method 2600E, the first threshold is 16 and the second threshold is 16. In some embodiments for method 2600E, the first motion candidate list comprises a single motion candidate list for video blocks coded with the mode. In some embodiments for method 2600E, the first motion candidate list comprises a single motion candidate list for video blocks not coded with the mode. In some embodiments for method 2600E, the performing the conversion comprises generating pixel values of the first video block from the bitstream representation. In some embodiments for method 2600E, the performing the conversion comprises generating the bitstream representation from pixel values of the first video block.

5 Example Implementations of the Disclosed Technology

Figure 27:
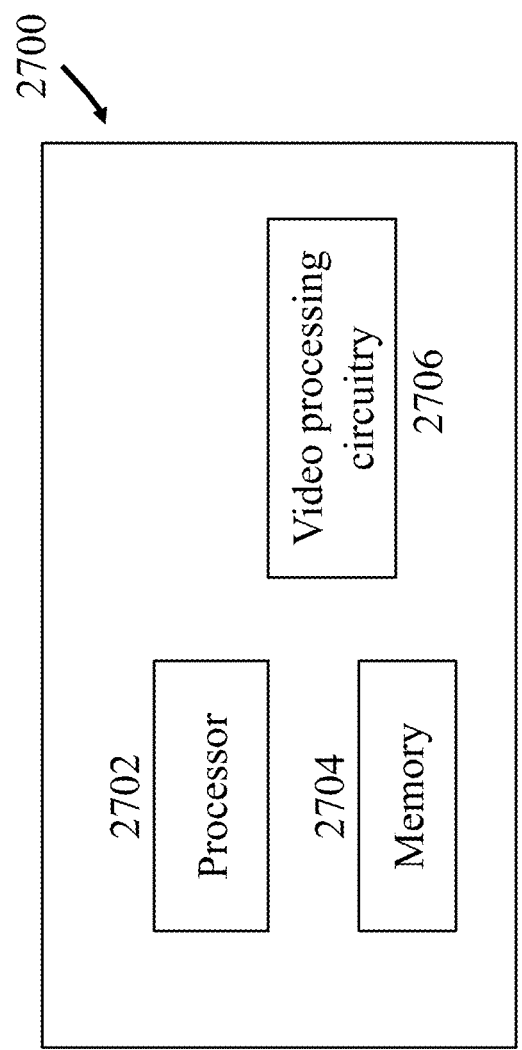
FIG. 27 is a block diagram of an example of a hardware platform for implementing a visual media decoding or a visual media encoding technique described in the present document.

FIG. 27 is a block diagram of a video processing apparatus 2700. The apparatus 2700 may be used to implement one or more of the methods described herein. The apparatus 2700 may be embodied in a smartphone, tablet, computer, Internet of Things (IoT) receiver, and so on. The apparatus 2700 may include one or more processors 2702, one or more memories 2704 and video processing hardware 2706. The processor(s) 2702 may be configured to implement one or more methods (including, but not limited to, method(s) 2600A to 2600E) described in the present document. The memory (memories) 2704 may be used for storing data and code used for implementing the methods and techniques described herein. The video processing hardware 2706 may be used to implement, in hardware circuitry, some techniques described in the present document.

In some embodiments, the video coding methods may be implemented using an apparatus that is implemented on a hardware platform as described with respect to FIG. 27.

Figure 28:
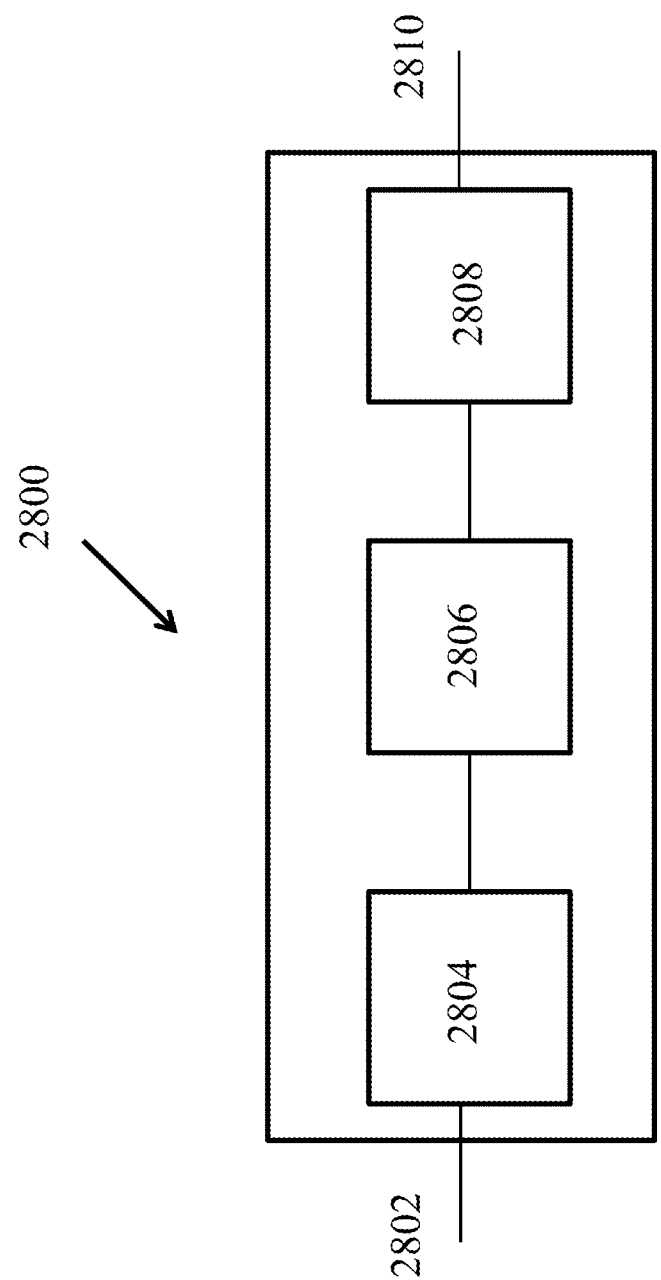
FIG. 28 is a block diagram of an example video processing system in which disclosed techniques may be implemented.

FIG. 28 is a block diagram showing an example video processing system 2800 in which various techniques disclosed herein may be implemented. Various implementations may include some or all of the components of the system 2800. The system 2800 may include input 2802 for receiving video content. The video content may be received in a raw or uncompressed format, e.g., 8 or 10 bit multi-component pixel values, or may be in a compressed or encoded format. The input 2802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2800 may include a coding component 2804 that may implement the various coding or encoding methods described in the present document. The coding component 2804 may reduce the average bitrate of video from the input 2802 to the output of the coding component 2804 to produce a coded representation of the video. The coding techniques are therefore sometimes called video compression or video transcoding techniques. The output of the coding component 2804 may be either stored, or transmitted via a communication connected, as represented by the component 2806. The stored or communicated bitstream (or coded) representation of the video received at the input 2802 may be used by the component 2808 for generating pixel values or displayable video that is sent to a display interface 2810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of processing video data, comprising:
constructing, for a conversion between a current block of a video using a first prediction mode and a bitstream of the video, a first motion candidate list that excludes motion candidates derived from temporal blocks, wherein in the first prediction mode, only sample values of a same video slice including the current block are used to derive prediction samples for the current block;
determining that motion candidates derived from spatial neighboring blocks are excluded from the first motion candidate list based on a dimension of the current block; and
checking a history-based motion vector prediction (HMVP) candidate to determine whether to add the HMVP candidate into the first motion candidate list,
wherein motion candidates derived from spatial neighboring blocks are excluded from the first motion candidate list based on a product of a height and a width of the current block is smaller than or equal to a predefined threshold.

2. The method of claim 1, wherein the first motion candidate list further excludes sub-block based temporal motion vector prediction candidate, wherein the sub-block based temporal motion vector prediction candidate comprises motion information derived based on a temporal motion offset.

3. The method of claim 1, wherein the first motion candidate list is constructed further based on a default motion candidate.

4. The method of claim 1, the default motion candidate includes zero motion candidate.

5. The method of claim 1, further comprising:
performing the conversion based on the first motion candidate list and a motion searching range.

6. The method of claim 1, wherein the motion searching range is related to a size of a current CTU includes the current block.

7. The method of claim 1, wherein a list size of the first motion candidate list is predefined.

8. The method of claim 1, wherein a list size of the first motion candidate list is included using a sequence parameter set (SPS).

9. The method of claim 1, wherein the conversion includes encoding the current block into the bitstream.

10. The method of claim 1, wherein the conversion includes decoding the current block from the bitstream.

11. An apparatus for processing video data comprising a processor and a non-transitory memory with instructions thereon, wherein the instructions upon execution by the processor, cause the processor to:
construct, for a conversion between a current block of a video using a first prediction mode and a bitstream of the video, a first motion candidate list that excludes motion candidates derived from temporal blocks, wherein in the first prediction mode, only sample values of a same video slice including the current block are used to derive prediction samples for the current block;
determine that motion candidates derived from spatial neighboring blocks are excluded from the first motion candidate list based on a dimension of the current block; and
check a history-based motion vector prediction (HMVP) candidate to determine whether to add the HMVP candidate into the first motion candidate list,
wherein motion candidates derived from spatial neighboring blocks are excluded from the first motion candidate list based on a product of a height and a width of the current block is smaller than or equal to a predefined threshold.

12. The apparatus of claim 11, wherein the first motion candidate list further excludes sub-block based temporal motion vector prediction candidate, wherein the sub-block based temporal motion vector prediction candidate comprises motion information derived based on a temporal motion offset.

13. The apparatus of claim 11, wherein the first motion candidate list is constructed further based on a default motion candidate.

14. The apparatus of claim 11, the default motion candidate includes zero motion candidate.

15. The apparatus of claim 11, wherein the instructions upon execution by the processor, further cause the processor to:
perform the conversion based on the first motion candidate list and a motion searching range.

16. The apparatus of claim 15, wherein the motion searching range is related to a size of a current CTU includes the current block.

17. A non-transitory computer-readable storage medium storing instructions that cause a processor to:
construct, for a conversion between a current block of a video using a first prediction mode and a bitstream of the video, a first motion candidate list that excludes motion candidates derived from temporal blocks, wherein in the first prediction mode, only sample values of a same video slice including the current block are used to derive prediction samples for the current block;
determine that motion candidates derived from spatial neighboring blocks are excluded from the first motion candidate list based on a dimension of the current block; and
check a history-based motion vector prediction (HMVP) candidate to determine whether to add the HMVP candidate into the first motion candidate list,
wherein motion candidates derived from spatial neighboring blocks are excluded from the first motion candidate list based on a product of a height and a width of the current block is smaller than or equal to a predefined threshold.

18. A non-transitory computer-readable recording medium storing a bitstream of a video which is generated by a method performed by a video processing apparatus, wherein the method comprises:
constructing, for a conversion between a current block of a video using a first prediction mode and a bitstream of the video, a first motion candidate list that excludes motion candidates derived from temporal blocks, wherein in the first prediction mode, only sample values of a same video slice including the current block are used to derive prediction samples for the current block;

determining that motion candidates derived from spatial neighboring blocks are excluded from the first motion candidate list based on a dimension of the current block;

checking a history-based motion vector prediction (HMVP) candidate to determine whether to add the HMVP candidate into the first motion candidate list; and generating the bitstream from the current block based on the first motion candidate list, wherein motion candidates derived from spatial neighboring blocks are excluded from the first motion candidate list based on a product of a height and a width of the current block is smaller than or equal to a predefined threshold.

* * * * *